United States Patent [19]
Byers et al.

[11] Patent Number: 5,535,405
[45] Date of Patent: Jul. 9, 1996

[54] MICROSEQUENCER BUS CONTROLLER SYSTEM

[75] Inventors: Larry L. Byers, Apple Valley; Joseba M. De Subijana, Minneapolis; Wayne A. Michaelson, Circle Pines, all of Minn.

[73] Assignee: UNISYS Corporation, Blue Bell, Pa.

[21] Appl. No.: 172,657

[22] Filed: Dec. 23, 1993

[51] Int. Cl.$^6$ .................................................. G06F 15/00
[52] U.S. Cl. .................. 395/800; 395/182.09; 395/307; 364/228.3; 364/232.23; 364/240.1; 364/240.5; 364/266.4; 364/DIG. 1
[58] Field of Search ..................................... 395/800, 575, 395/307, 182.09, 183.1; 371/68.3; 364/228.3, 232.23, 240.1, 240.5, 266.4, DIG. 1

[56] References Cited

U.S. PATENT DOCUMENTS

| | | | |
|---|---|---|---|
| 3,864,670 | 2/1975 | Inoue et al. | 395/182.1 |
| 4,607,365 | 8/1986 | Greig et al. | 395/182.02 |
| 4,703,421 | 10/1987 | Abrant et al. | 364/200 |
| 4,736,317 | 4/1988 | Hu et al. | 364/200 |
| 4,766,566 | 8/1988 | Chuang | 364/900 |
| 4,947,316 | 8/1990 | Fisk | 364/200 |
| 4,992,934 | 2/1991 | Portanova | 364/200 |
| 5,005,174 | 4/1991 | Bruckert et al. | 371/68.3 |
| 5,193,175 | 3/1993 | Cutts, Jr. et al. | 395/575 |
| 5,193,206 | 3/1993 | Mills | 395/800 |
| 5,195,101 | 3/1993 | Guenthner et al. | 371/68.3 |
| 5,214,786 | 5/1993 | Wantanabe et al. | 395/800 |
| 5,226,152 | 7/1993 | Klug et al. | 395/575 |
| 5,377,332 | 12/1994 | Entwistle et al. | 395/297 |

OTHER PUBLICATIONS

Christian Piquet, "Binary–Decision and RISC–like Machines for Semicustom Design", Microproc. and Microsystems, May 1990, pp. 231–239.

Manolis G. H. Katevenis, "Reduced Instruction Set Computer Architectures for VLSI", 1985, pp. 86–117.

*Primary Examiner*—Alyssa H. Bowler
*Assistant Examiner*—John Harrity
*Attorney, Agent, or Firm*—Steven P. Skabrat; Charles A. Johnson; Mark T. Starr

[57] ABSTRACT

A microsequencer bus controller system provides a flexible and efficient mechanism for controlling multiple gate arrays called stations embedded within a larger computer system. A control store memory, loaded at system initialization time, holds fixed-length instructions simultaneously executed by dual reduced instruction set (RISC) microprocessors which interface with the multiple stations over a bi-directional bus. The master microprocessor compares the result of the processing of each instruction with the slave microprocessor's result to detect any differences, thereby minimizing error latency. Master and slave microprocessors each control half of the stations on the bus. Data widths of 32-bit and 36-bit words are supported by the microprocessors, bus, and stations.

32 Claims, 35 Drawing Sheets

FIG. 30

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| M | R | M | R | M | R | M | R | M | R | M | R | M | R | M | R | M | R | M | R | M | R | M | R | M | R | M | R | M | R | M | R | M | R | M | R |

FIG. 31

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
|   | M | R | M | R | M | R | M | R | M | R | M | R | M | R | M | R | M | R | M | R | M | R | M | R | M | R | M | R | M | R | M | R | M | R | M | R |

686

| LOGIC FUNCTION | ALU CODE |
|---|---|
| 1 | 00000 |
| A or B | 00001 |
| (not A) or B | 00010 |
| B | 00011 |
| A or (not B) | 00100 |
| A | 00101 |
| not (A xor B) | 00110 |
| A and B | 00111 |
| (not A) or (not B) | 01000 |
| A xor B | 01001 |
| not A | 01010 |
| (not A) and B | 01011 |
| not B | 01100 |
| A and (not B) | 01101 |
| (not A) and (not B) | 01110 |
| 0 | 01111 |

| ARITHMETIC FUNCTION | ALU CODE |
|---|---|
| A  (Cin = 0) | 10001 |
| A + Cin  (Cin = 1) | 10011 |
| B  (Cin = 0) | 10101 |
| B + Cin  (Cin = 1) | 10111 |
| A - B - 1  (Cin = 0) | 10000 |
| A - B - 1 + Cin  (Cin = 1) | 10010 |
| B - A - 1  (Cin = 0) | 10100 |
| B - A - 1 + Cin  (Cin = 1) | 10110 |
| A + B  (Cin = 0) | 11001 |
| A + B + Cin  (Cin = 1) | 11011 |
| A - 1  (Cin = 0) | 11000 |
| A - 1 + Cin  (Cin = 1) | 11010 |
| B - 1  (Cin = 0) | 11100 |
| B - 1 + Cin  (Cin = 1) | 11110 |

FIG. 33

MICROSEQUENCER BUS CONTROLLER SYSTEM

CROSS REFERENCES TO RELATED APPLICATIONS

This application is related to the concurrently filed applications listed below, the disclosures of which are incorporated herein by reference. All of the listed applications are assigned to the same assignee as the present invention.

Branch Instruction Using Dynamic Branch Address Tables, Ser. No. 08/173,545, invented by Larry L. Byers, Joseba M. De Subijana, and Wayne A. Michaelson.

System And Method For Processing External Conditional Branch Instructions, Ser. No. 08/359,862, invented by Larry L. Byers, Joseba M. De Subijana, and Wayne A. Michaelson.

System For Processing Shift, Mask, And Merge Operations In One Instruction, Ser. No. 08/172,526, invented by Larry L. Byers, Joseba M. De Subijana, and Wayne A. Michaelson.

Stuck Fault Detection For Branch Instruction Condition Signals, Ser. No. 08/173,598, invented by Larry L. Byers, Joseba M. De Subijana, and Wayne A. Michaelson.

Multiple Width Data Bus For A Microsequencer Bus Controller System, Ser. No. 08/173,317, invented by Larry L. Byers, Joseba De Subijana, Wayne A. Michaelson, Lloyd E. Thorsbakken, and Howard H. Tran.

Multiple Use Addressing In A Microsequencer Bus Controller System, Ser. No. 08/172,629, invented by Larry L. Byers, Joseba M. De Subijana, and Wayne A. Michaelson.

BACKGROUND OF THE INVENTION

1. Field of the Invention

This invention relates generally to multi-processor computer systems. More specifically, it relates to multi-processor reduced instruction set computer (RISC) systems which use fixed length instructions to control special purpose Very Large Scale Integration (VLSI) gate arrays.

2. Background Information

Many computer systems today are composed of multiple processing units in order to increase their processing power. These programmable processors often must interact with hardwired logic such as VLSI gate arrays. Some functions of complex computer systems are performed by such hardware because of the increased speed capabilities this hardware provides. However, other functions may be better implemented in software or firmware because of the flexibility software or firmware provides. In a large computer system such as the Extended Processing Complex (XPC), a file cache system designed to operate in conjunction with a 2200 Series computer system, both of which are available from Unisys Corporation, some capabilities of embedded subsystems are implemented in a combination of hardware and software/firmware. These subsystems performed required functions as components of the larger system. These subsystems combine the increased speed of hardware implementations with the flexible nature of programming to efficiently satisfy subsystem requirements.

Fault detection capabilities are also important for such subsystems. These subsystems must detect any errors that occur during processing at the earliest possible time, before the error propagates throughout the entire system, potentially corrupting critical data. Consonant with increased fault detection capabilities is the requirement for the subsystem to communicate with the system maintenance function of the larger computer system wherein the subsystem is embedded to report any faults that are detected. Because commercial microprocessors such as the Intel X86-series or Motorola 68000-series microprocessors do not easily support unique system maintenance functions, a custom microprocessor-based subsystem is required that not only minimizes error latency times but also reports the error in a manner that is easily processed by other functions within the larger system.

In addition, the subsystem disclosed herein must be capable of processing either 32-bit or 36-bit data words. Since Intel X86-series and Motorola 68000-series microprocessors operate on 32-bit words, they would be unsuitable for processing the 36-bit data words supported by the 2200 Series computer systems that the present subsystem must interact with. The microprocessor used in the present invention must be able to be configured for either 32-bit or 36-bit modes of operation by setting an external pin.

Therefore, a custom microprocessor-based system is required to meet speed requirements and it must contain simple logic in order to minimize development costs. A reduced instruction set computer (RISC) satisfies these requirements. RISC processors implement a small set of very basic instructions to minimize instruction decode and execution times. RISC processors operate on fixed length instructions that support only one or two operands. Because of the simplicity of the instruction set, the logic design of a RISC processor is hardwired rather than microprogrammed. Thus, the overall speed of the processor is improved.

The novel arrangement for a multiprocessor data processing system disclosed herein fulfills the above stated requirements and avoids the problems inherent in using existing prior art microprocessors and computer architectures.

SUMMARY OF THE INVENTION

An object of this invention is to efficiently control the operation of special purpose gate arrays intended to store and transfer data between a special purpose gate array and an external device or system and between special purpose gate arrays.

Another object of this invention is to process either 32-bit or 36-bit data words in a RISC microprocessor-based system.

Still another object of this invention is to increase data transfer rates through the system by using RISC machines as the microprocessors.

Yet another object of this invention is to improve fault detection capabilities in a RISC microprocessor-based system by using dual RISC microprocessors simultaneously executing the same instruction stream to control special purpose gate arrays in the system, whereby the master and slave microprocessors compare the results of each operation to detect any errors.

Still another object of this invention is to allow for modification or replacement of special purpose gate arrays providing new functionality without affecting the remainder of the hardware design of the system.

Yet another object of this invention is to support the test and maintenance requirements of a larger computer system wherein the subject invention is embedded.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by an improved multiprocessor architecture that provides increased system throughput, better and earlier fault detection capabilities, increased system flexibility, and access to system maintenance features inherent in a larger computer system within which this invention is embedded. This invention is a microsequencer bus controller system that is designed to be coupled with other subsystems embedded in a larger computer system such as the Extended Processing Complex, a file cache system.

In accordance with an aspect of this invention, the system, designed to be coupled with other subsystems embedded in a computer system comprises a control store including addressable memory where predefined instructions are stored. First and second microprocessors are coupled to the control store, each functioning to simultaneously execute in parallel the instructions fetched from the control store. The first microprocessor contains circuitry to compare the results of its execution of each instruction with the second microprocessor's execution of each instruction to detect at the earliest possible time an error occurring in either microprocessor. A bi-directional bus is provided to allow the first and second microprocessors to control a plurality of special purpose gate arrays called stations. The first microprocessor controls some of the stations and the second microprocessor controls the remainder of the stations. Each station may transfer data to and from another station or another subsystem. The size of the data words transferred across the bi-directional bus and processed by the first and second microprocessors may be either 32 bits or 36 bits. The first and second microprocessors are reduced instruction set computers, thus providing increased instruction processing speed due to a shorter instruction decode time and simplified processing logic.

In accordance with another aspect of the invention, a method for controlling a plurality of stations connected to each other by a bi-directional bus and to other subsystems of a computer system, wherein the mechanism to control the stations comprises first and second microprocessors simultaneously executing in parallel the same instructions stored in a control store memory, comprises fetching an instruction from the control store memory and loading it into an instruction register in each of the microprocessors. The instructions are decoded to determine the requested command and the requested station to be accessed. The operands specified by the instructions are then fetched from registers internal to the microprocessors, from a local store memory internal to the microprocessors, or from designators resident on the requested station by transferring the operands over the bi-directional bus. Next, the requested command is executed by the microprocessors and the result is stored in an internal register, a local store memory location, or on a designator resident on the requested station. The result of the execution of the requested command by the second microprocessor is compared with the result of the execution of the requested command by the first microprocessor to detect an error if the results do not match. If any errors are detected, the microprocessors are halted. If not, a new instruction is fetched from the control store memory and processing continues as described above.

The method and apparatus of the invention thus provides improved fault detection capabilities for a RISC microprocessor-based system used to control special purpose gate arrays utilizing a variable width data path.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 30 shows the format of the Mask and Merge operand for a 36-bit data word.

FIG. 31 shows the format of the Mask and merge operand for a 32-bit data word.

FIG. 33 is a list of the arithmetic and logical operations supported by the Arithmetic Logic instruction.

DESCRIPTION OF THE PREFERRED EMBODIMENT

I. System Architecture Overview

Figure 1:
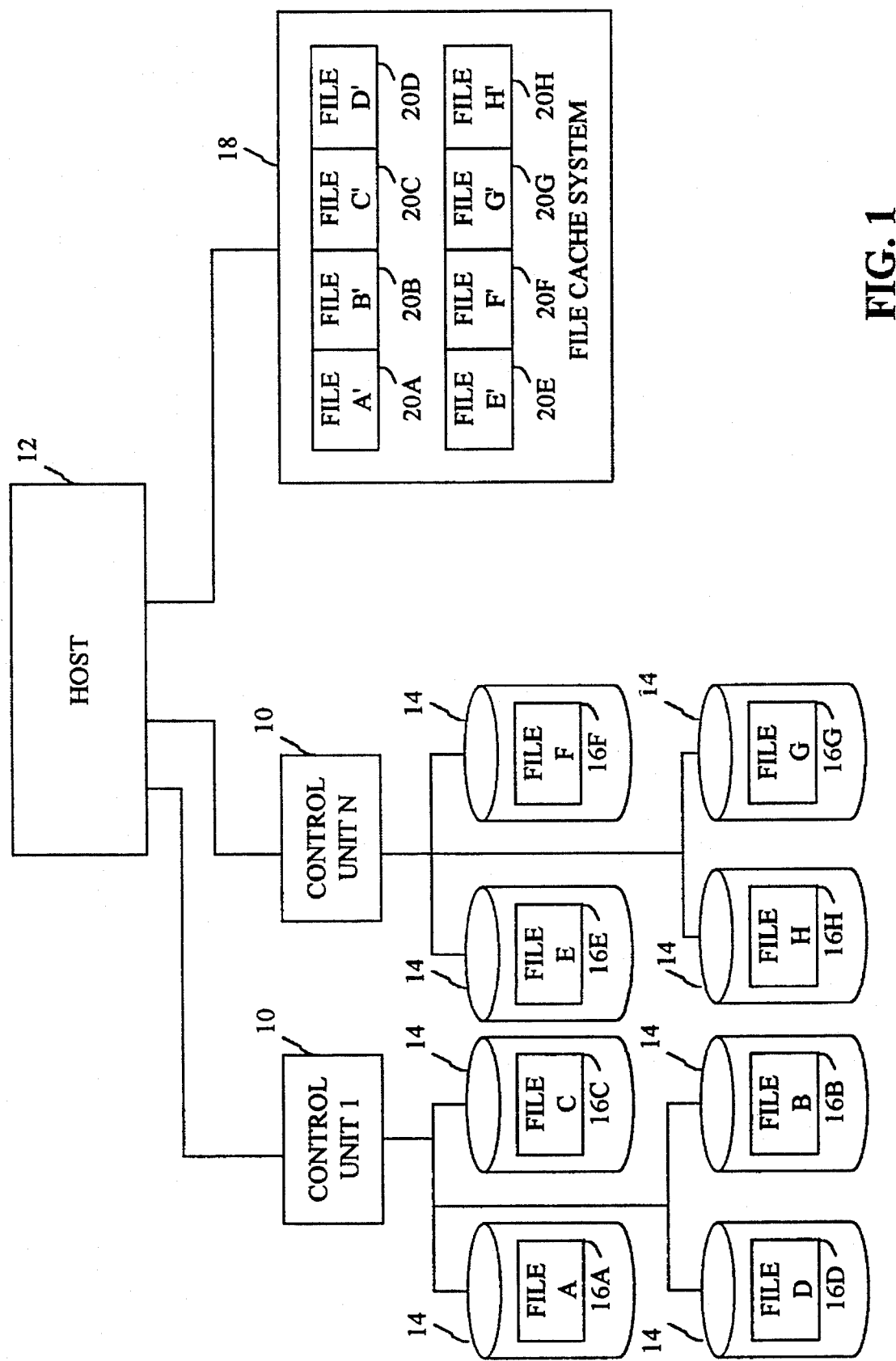
FIG. 1 illustrates the environment in which this invention operates.

FIG. 1 illustrates the environment in which this invention operates. In a typical large computer system, a plurality of Control Units 10 are coupled to a Host computer 12 for providing access to multiple mass storage Disks 14. In the preferred embodiment, the Host 12 is a 2200 Series computer system available from Unisys Corporation. Application and system software executing on Host 12 reads data from and writes data to Files 16A–H, which are stored on Disks 14. While Files 16A–H are depicted as blocks it should be understood that the data is not necessarily stored contiguously in Disks 14.

The File Cache System 18, of which the subject invention is a part, provides an intermediate storage capability for the Host 12 with a greatly improved file access time and resiliency against data loss which is comparable to Disks 14. All or parts of active Files 16 may be stored in the File Cache System 18 depending on the storage capacity of the File Cache System 18, and the size and number of Files 16 selected by the system software on the Host 12 to be cached.

The portion of Files 16 that are stored in the File Cache System 18 are shown as blocks 20A–H. The cached portion of Files 16 are labelled File A', File B', . . . , File H' for discussion purposes. File A' 20A is the portion of File A that is stored in File Cache System 18; File B' 20B is the portion of File B that is stored in File Cache System 18; and so on. The existence of the File Cache System at this level of the storage hierarchy allows references to cached files to be immediately directed to the File Cache System for processing, in contrast to references to non-cached files where an Input/Output (I/O) channel program must be constructed on the Host 12 to access the proper Disk 14 via a Control Unit 10. The implementation of the File Cache System 18 reduces the path length that a request must travel in order to update a File 16. This reduced path length, coupled with the powerful processing capabilities of the File Cache System 18, results in shortened File access times.

Figure 2:
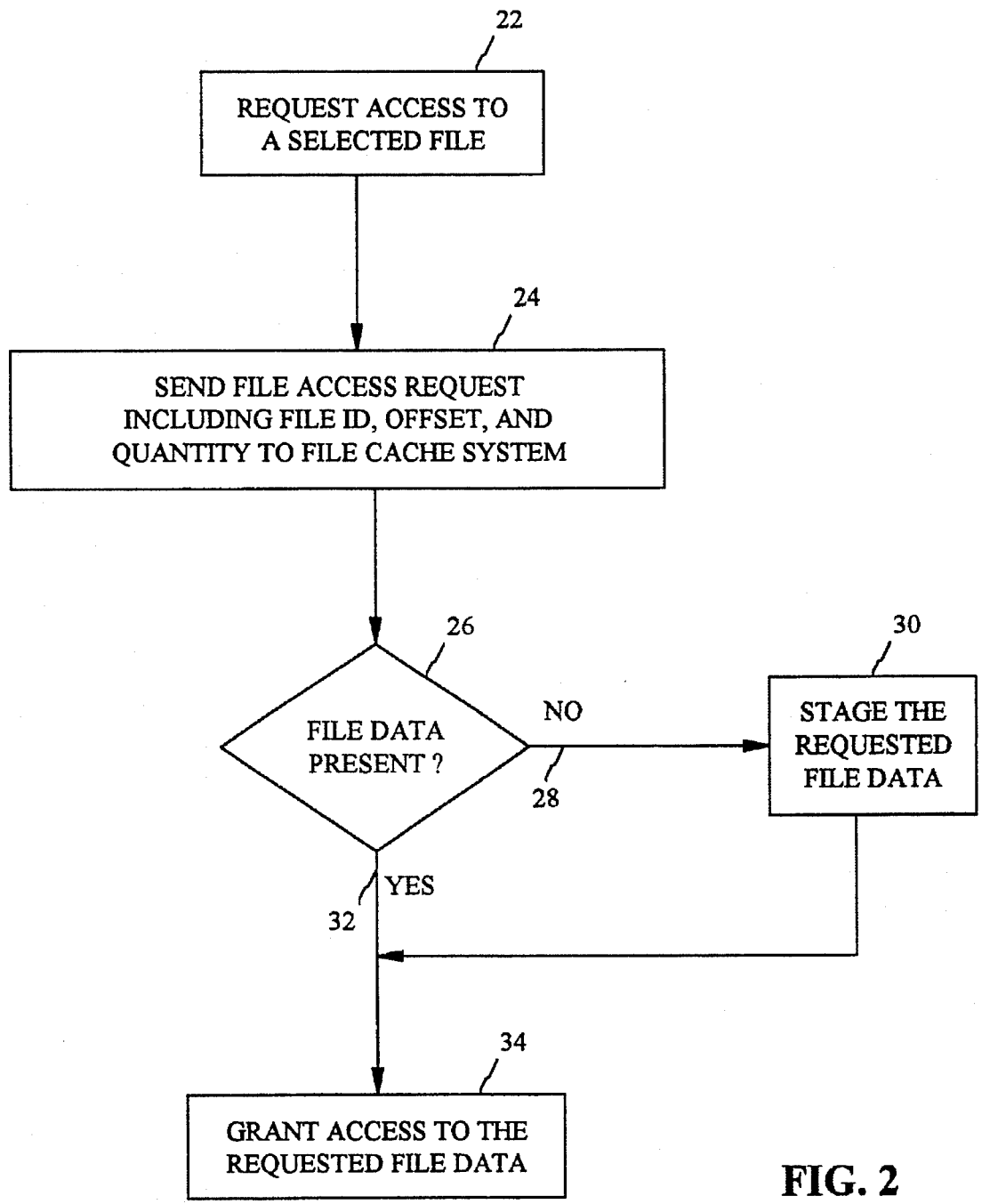
FIG. 2 is a flow chart showing how file accesses are accomplished within the File Cache System.

FIG. 2 is a flow chart showing how file accesses are accomplished within the File Cache System. The processing begins at Step 22 where application software executing on Host 12 requests access to a selected File. The access request may a request to read data from or write data to the selected File.

A File access request is sent to the File Cache System 18 at Step 24. The File access request contains a File identifier (ID), which specifies the File on which the read or write operation is to be performed; an offset from the beginning of the File, which specifies precisely where in the File the operation is to begin; and the quantity of data which is to be read from or written to the File. At Test 26, the File Cache System 18 uses the File ID, offset, and quantity to determine if the requested File data is already present in the File Cache System. If the requested File data is not present, then Path 28 is followed to Step 30, and the File Cache System 18 "stages" (reads) the requested File data from the appropriate File 16 on Disk 14 to the cached File 20 in the File Cache System. If the requested File data is present, Path 32 is followed to Step 34 where the File Cache System grants access to the requested File data.

Figure 3:
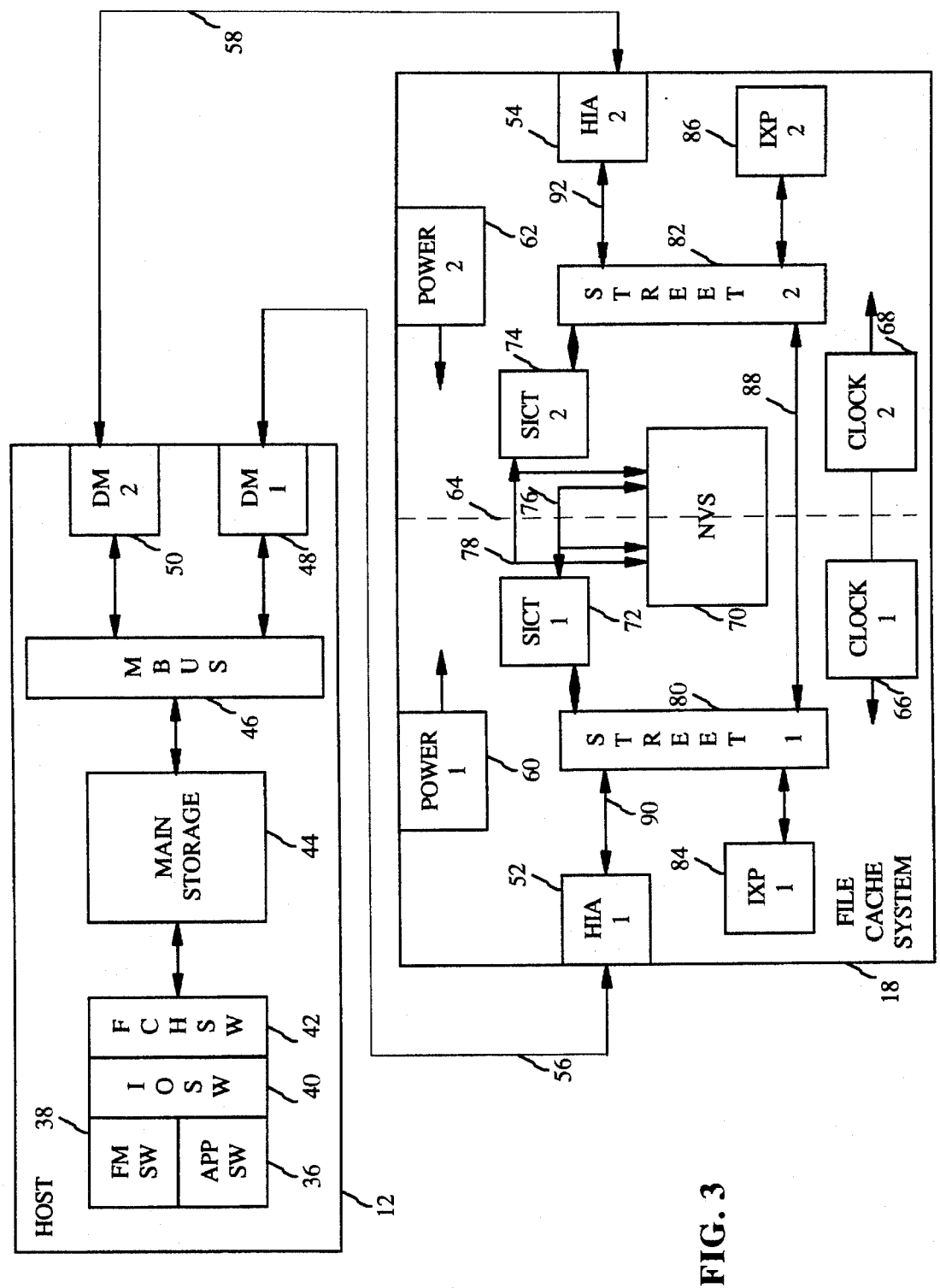
FIG. 3 is a functional block diagram of the hardware and software components of the File Cache System.

FIG. 3 is a functional block diagram of the hardware and software components of the File Cache System. The system is comprised of hardware and software elements in both the Host 12 and File Cache System 18. The software on Host 12 is shown by blocks 36, 38, 40, and 42. The blocks are joined to signify the interrelationships and interfaces between the software elements.

Application Software (APP SW) 36 provides data processing functionality to Host system 12 end users and includes applications such as financial transaction processing and airline reservations systems. Data bases maintained by Application Software 36 may be stored in one or more of the exemplary Files 16 as shown in FIG. 1. File Management Software (FM SW) 38, Input/Output Software (IO SW) 40, and File Cache Handler Software (FCH SW) 42 are all components of the Host's operating system software (not shown). In general, File Management Software 38 provides management of file control structures, and in particular handles the creating, deleting, opening, and closing of files.

Input/Output Software 40 provides the software interface to each of the various I/O devices coupled to the Host 12. The I/O devices may include network communication processors, magnetic disks, printers, magnetic tapes, and optical disks. Input/Output Software 40 builds channel programs, provides the channel programs to the appropriate I/O processor function within the Host 12, and returns control to the requesting software at the appropriate time.

File Cache Handler Software 42 coordinates the read and write accesses to cached files. In general, File Cache Handler Software 42 provides the operating system level interface to the File Cache System 18, "stages" (reads) File data from Disks 14 to the File Cache System 18, and "destages" (writes) File data from the File Cache System 18 to Disks 14. The File Cache Handler Software 42 provides File data and File access requests to the hardware interface to the File Cache System 18 via Main Storage 44. Main Storage 44 is coupled to an I/O bus called the M-Bus 46.

The Data Mover (DM) components 48, 50 provide the hardware interface to the File Cache System 18. While two DMs 48, 50 are shown, the system does not require two DMs for normal operations. A configuration with two DMs provides fault tolerant operation; that is, if one DM fails, the other DM is available to process File access requests. In alternate embodiments, there could be many DMs. Each DM 48, 50 is coupled to the M-Bus 46 of Host 12. File Cache Handler Software 42 distributes File access requests among each of the DMs 48, 50 coupled to M-Bus 46. If one DM fails, File access requests queued to that DM can be redistributed to the other DM.

The Data Movers (DMs) 48, 50 perform the same general functions as an I/O processor, that is, they read data from and write data to a peripheral device. The DMs can also read from and write to Main Storage 44 via the M-Bus 44. The DMs 48, 50 coordinate the processing of File access requests between File Cache Handler Software 42 and the File Cache System 18 and transfer File data between Main Storage 44 and the File Cache System 18. Each of the DMs is coupled to a Host Interface Adapter (HIA) 52, 54 component within the File Cache System 18. DM1 48 is coupled to HIA 1 52 by a Fiber Optic Interface shown as Line 56, and DM 2 50 is coupled to HIA 2 54 by a second Fiber Optic Interface shown as Line 58.

The File Cache System 18 is configured with redundant power, redundant clocking, redundant storage, redundant storage access paths, and redundant processors for processing File access requests, all of which cooperate to provide a fault tolerant architecture for storing File data. The File Cache System 18 is powered by dual Power Supplies, Power 1 60 and Power 2 62. The portion of the File Cache System 18 to the left of dashed line 64 is powered by Power 1 60 and is referred to as Power Domain 1, and the portion of the File Cache System to the right of dashed line 64 is powered by Power 2 62 and is referred to as Power Domain 2. Each of the Power Supplies 1 and 2 has a dedicated battery and generator backup to protect against loss of the input power source.

Clock 1 66 and Clock 2 68 are separately powered to provide timing signals to all of the components of the File Cache System 18. Clock 1 66 provides timing to the components within Power Domain 1 and Clock 2 68 provides timing to the components within Power Domain 2. Redundant oscillators within each Clock provide protection against the failure of one, and Clocks 1 and 2 are synchronized for consistent timing across Power Domains 1 and 2.

The Non-Volatile Storage (NVS) component 70 includes multiple dynamic random access memory (DRAM) storage modules. Half of the storage modules are within Power Domain 1 and the other half are within Power Domain 2. The data stored in the storage modules in Power Domain 2 is identical to the data stored in storage modules in Power Domain 1. Thus, NVS 70 provides for the redundant storage of File data 20 and the control structures used by the File Cache System 18. The redundant storage organization supports both single and multiple bit error detection and correction.

The portion of NVS 70 within each of the Power Domains 1 and 2 is coupled to two Storage Interface Controllers (SICTs) 72, 74. While only two SICTs are shown in FIG. 3, each half of NVS 70 is capable of being addressed by up to four SICTs. Line 76 represents the coupling between SICT 1 72 and the portion of NVS 70 within each of Power Domains 1 and 2. Similarly, Line 78 represents the coupling between SICT 2 74 and NVS 70.

Read and write requests for Non-Volatile Storage (NVS) 70 are sent to the SICTs 72, 74 via local network Street 1 80 and Street 2 82. The Street provides data transfer and interprocessor communication facilities between the major components within the File Cache System 18. The Streets provide multiple requesters (HIA 1 52, HIA 2 54, Index Processor (IXP) 1 84, or IXP 2 86) with high-speed, high-bandwidth access to NVS 70, as well as multiple paths for redundant access. Crossover 88 provides a path whereby NVS 70 requests may be sent from Street 1 80 to Street 2 82, or visa versa, if a SICT 72, 74 is unavailable. For example, if SICT 1 72 fails, NVS requests sent from requesters (HIAs and IXPs) are sent to Street 2 82 via Crossover 88, whereby NVS 70 access is provided by SICT 2 74. Each SICT is capable of updating both halves of the NVS 70.

The Host Interface Adaptors (HIAs) 52, 54 perform functions in the File Cache System 18 which are similar to the functions performed by the Data Movers (DMs) 48, 50 on the Host 12. In particular, the HIAs receive File access requests sent from the DMs, write File data sent from the Host 12 to NVS 70, and read File data from NVS and send it to the Host. The HIAs also contain the logic for sending and receiving data over the Fiber Optic Interfaces 56, 58. HIA 1 52 interfaces with Street 1 80 over Line 90, and HIA 2 54 interfaces with Street 2 82 over Line 92.

Index Processor (IXP) 1 84 and IXP 2 86 manage allocation of the storage space available in NVS 70, service file access requests sent from Host 12, and generally provide for overall File Cache System management.

Figure 4:
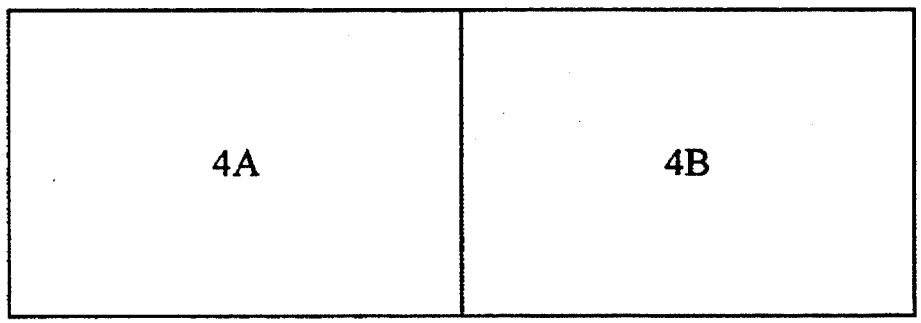
FIG. 4, comprising
Figure 4A:
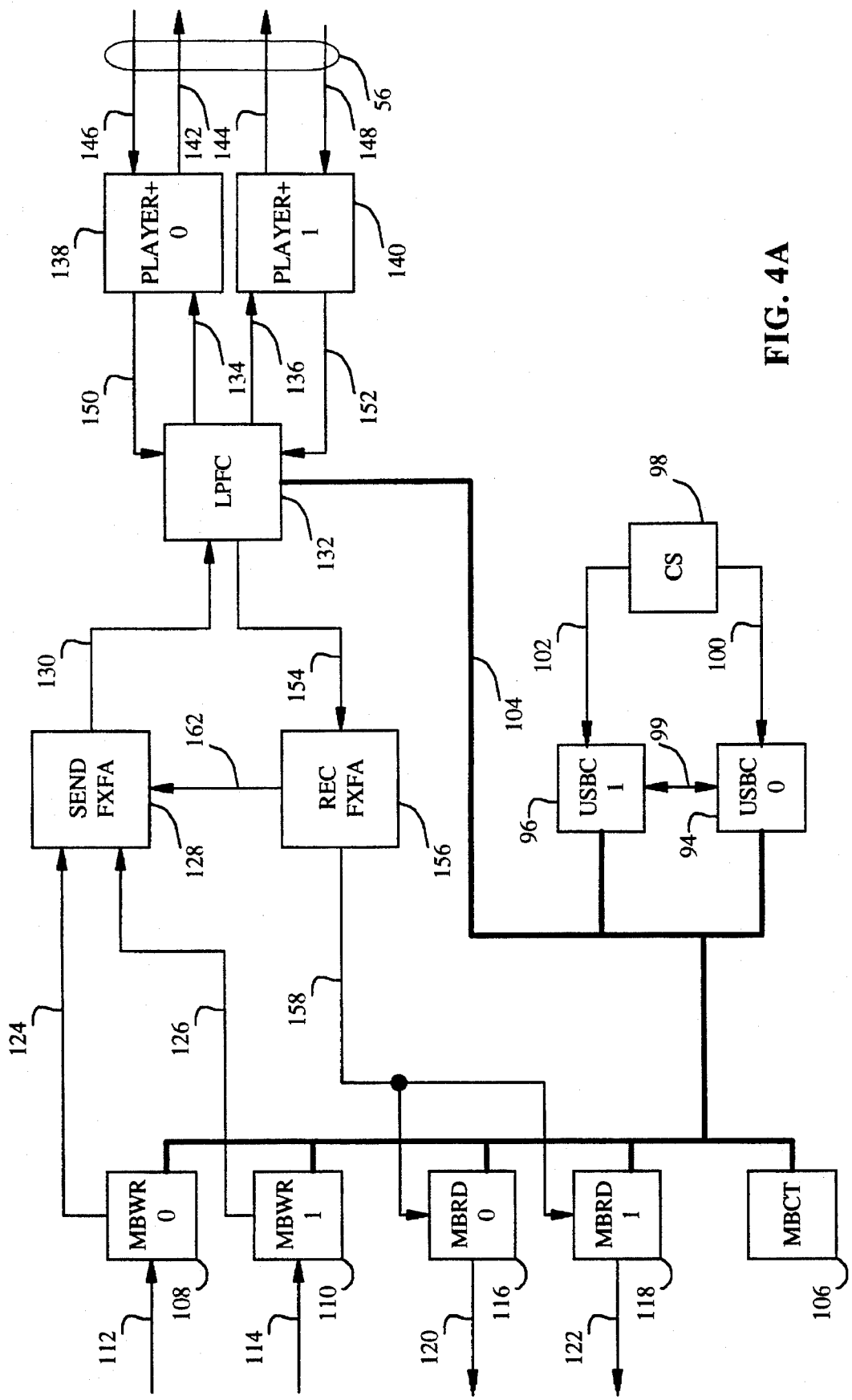
FIG. 4(A) and FIG. 4(B), is a detailed block diagram showing the components of a Data Mover and a Host Interface Adaptor.
Figure 4B:
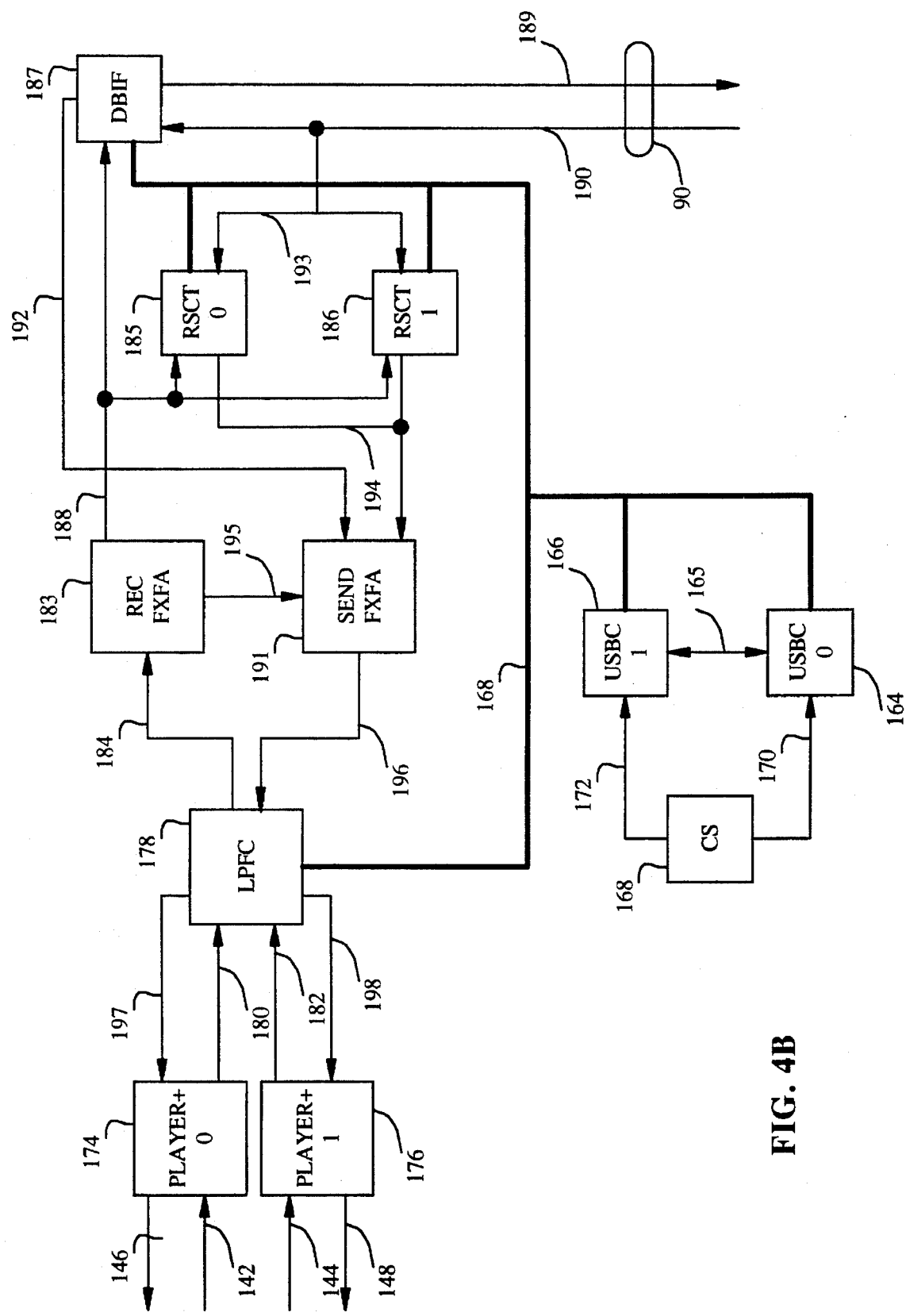

FIG. 4, comprising FIG. 4(A) and FIG. 4(B), is a detailed block diagram showing the components of a Data Mover and a Host Interface Adaptor. The DM and HIA exist as a pair because they are opposing ends of a communications path. The DM component 48 and the HIA component 52 are each instances of the Microsequencer Bus Controller (USBC) System. The DM 48 interfaces with the M-Bus 46 on the Host 12. The DM also communicates with the HIA 52 over Fiber Optic Interface 56. Thus, the DM and the HIA may be physically located some distance apart from each other, the actual distance being dependent on the length of the Fiber Optic Interface 56. The HIA 52 interfaces over Lines 90 to the Street 80.

FIG. 4(A) shows the components of a Data Mover. The architecture of the DM 48 as an instance of a Microsequencer Bus Controller System shows that there are two Microsequencer Bus Controllers (uSBCs) 94, 96 connected to a Control Store (CS) 98 via Lines 100, 102. The uSBC 0 94 and uSBC 1 96 are Reduced Instruction Set (RISC) microprocessors that control various special purpose gate arrays called Stations over the Micro Bus 104. The Micro Bus 104 is a bi-directional communications bus. The uSBCs support an instruction set with seven basic instructions in it. The instructions are of fixed length and specify either one or two operands only. The internal circuitry of the uSBCs is "hard-wired", i.e., it is not microprogrammed. The results from operations performed by uSBC 1 96 are transferred to uSBC 0 94 for error detection purposes over Line 99. The Control Store 98, consisting of seven static random access memories (SRAMs), is used to store an instruction stream that the uSBCs execute in parallel.

The M-Bus Controller (MBCT) Station 106 handles M-Bus 46 arbitration and controls data transfers between other Data Mover (DM) Stations and the M-Bus 46. There are two DM Stations to transfer data to the M-Bus 46 and two DM Stations to transfer data from the M-Bus. The M-Bus Write (MBWR) 0 108 and MBWR 1 110 Stations receive data from the M-Bus 46 via Lines 112 and 114, respectively. The M-Bus Read (MBRD) 0 116 and MBRD 1 118 Stations send data to the M-Bus 46 via Lines 120 and 122 respectively. The MBCT 106 controls the access of these DM Stations to the M-Bus 46 over an interface (not shown) separate from the Micro Bus. Data is passed from MBWR 0 108 and MBWR 1 110 via Lines 124 and 126 to the Send Frame Transfer Facility (SEND FXFA) gate array 128. The SEND FXFA 128 packages the data into transmission packets called frames, which are passed over Line 130 to the Light Pipe Frame Control (LPFC) gate array 132. The LPFC 132 sends the frame over Lines 134 and 136 to dual PLAYER+Physical Layer Controllers, consisting of PLAYER+0 138 and PLAYER+1 140, which are commercially available from National Semiconductor Corporation. The PLAYER+0 138 and PLAYER+1 140 transmit frames over Fiber Optic Links 142 and 144 to the HIA 52.

When the Host Interface Adaptor (HIA) 52 sends flames to the Data Mover (DM) 48, PLAYER+0 138 and PLAYER+1 140 receive the flames over Fiber Optic Links 146 and 148. The PLAYER+0 138 component forwards its frame over Line 150 to the LPFC 132. Similarly, the PLAYER+1 140 component forwards its frame over Line 152 to the LPFC. The LPFC sends the flames via Line 154 to the Receive Frame Transfer Facility (REC FXFA) gate array 156, which unpacks the data and stores it in MBRD 0 116 and MBRD 1 118 via Line 158. The REC FXFA 156 sends an acknowledgment for the data transfer to the SEND FXFA 128 over Line 162.

FIG. 4(B) shows the components of a Host Interface Adaptor. The architecture of the HIA 52 as an instance of a Microsequencer Bus Controller System shows that there are two uSBCs 164, 166 connected to a Control Store 168 via Lines 170, 172, respectively. The Microsequencer Bus Controllers (uSBCs) 164, 166 access the HIA Stations via the Micro Bus 168. The PLAYER+0 174 and PLAYER+1 176 components receive frames over Fiber Optic Links 142 and 144, respectively. PLAYER+0 174 forwards its frame to Light Pipe Frame Control (LPFC) 178 over Line 180. Similarly, PLAYER+1 176 forwards its frame to LPFC 178 over Line 182. The LPFC 178 transfers the frames to the Receive Frame Transfer Facility (REC FXFA) 183 over Line 184. The REC FXFA 183 unpacks the frames and stores control information in the Request Status Control Table 0 (RSCT) 185 and the RSCT 1 186 Stations via Line 188. The RSCT 0 and RSCT 1 Stations monitor the data that has been received from the DM 48. The data which was contained in the frame received by the REC FXFA 183 is sent to the Database Interface (DBIF) Station 187 over Line 188. The DBIF 187 forwards the data over Line 189 to the Street 1 80.

Data received by the DBIF 187 over Line 190 from the Street 1 80 is sent to the Send Frame Transfer Facility (SEND FXFA) 191 via Line 192. Control information received over Line 190 from the Street 1 80 is sent to RSCT 0 185 and RSCT 1 186 over Line 193. The SEND FXFA 191 takes this data and control information from RSCT 0 185 and RSCT 1 186 via Line 194 and formats a frame for transmission by the LPFC 178. Acknowledgements from REC FXFA 183 are received by SEND FXFA 191 over Line 195. The frame is forwarded over line 196 to the LPFC 178. The LPFC 178 creates two flames from the frame it received and sends one frame to PLAYER+0 174 over Line 197 and the other frame to PLAYER+1 176 over Line 198. The frames are then transmitted over the Fiber Optic Links 146 and 148 to the DM 48.

The Microsequencer Bus Controllers (uSBCs) 94, 96, 164, 166 and the Micro Busses 104, 168 manipulate data in the system according to a hardware mode pin setting. When the mode pin is set, the Microsequencer Bus Controller System instance is a Data Mover (DM) 48 operating on 36-bit data words in communicating with its Stations. When the mode pin is clear, the Microsequencer Bus Controller System is a Host Interface Adaptor (HIA) 52 operating on 32-bit data words in communicating with its Stations.

II. Microsequencer Bus Controller System Architecture

The Microsequencer Bus Controller System provides the capability of flexible, microprocessor-based control of multiple gate arrays on a circuit card within a larger computer system. In the preferred embodiment as described above, it is a part of the File Cache System 18. However, it may also be used in other computer systems where microprocessor control of multiple gate arrays is needed. It is a flexible solution to the problem of controlling function-specific VLSI gate arrays on one circuit card because one or more gate arrays can be changed without any other changes in the Microsequencer Bus Controller System hardware. When a gate array is changed, a corresponding change to the program the microprocessors execute may easily be made.

Figure 5:
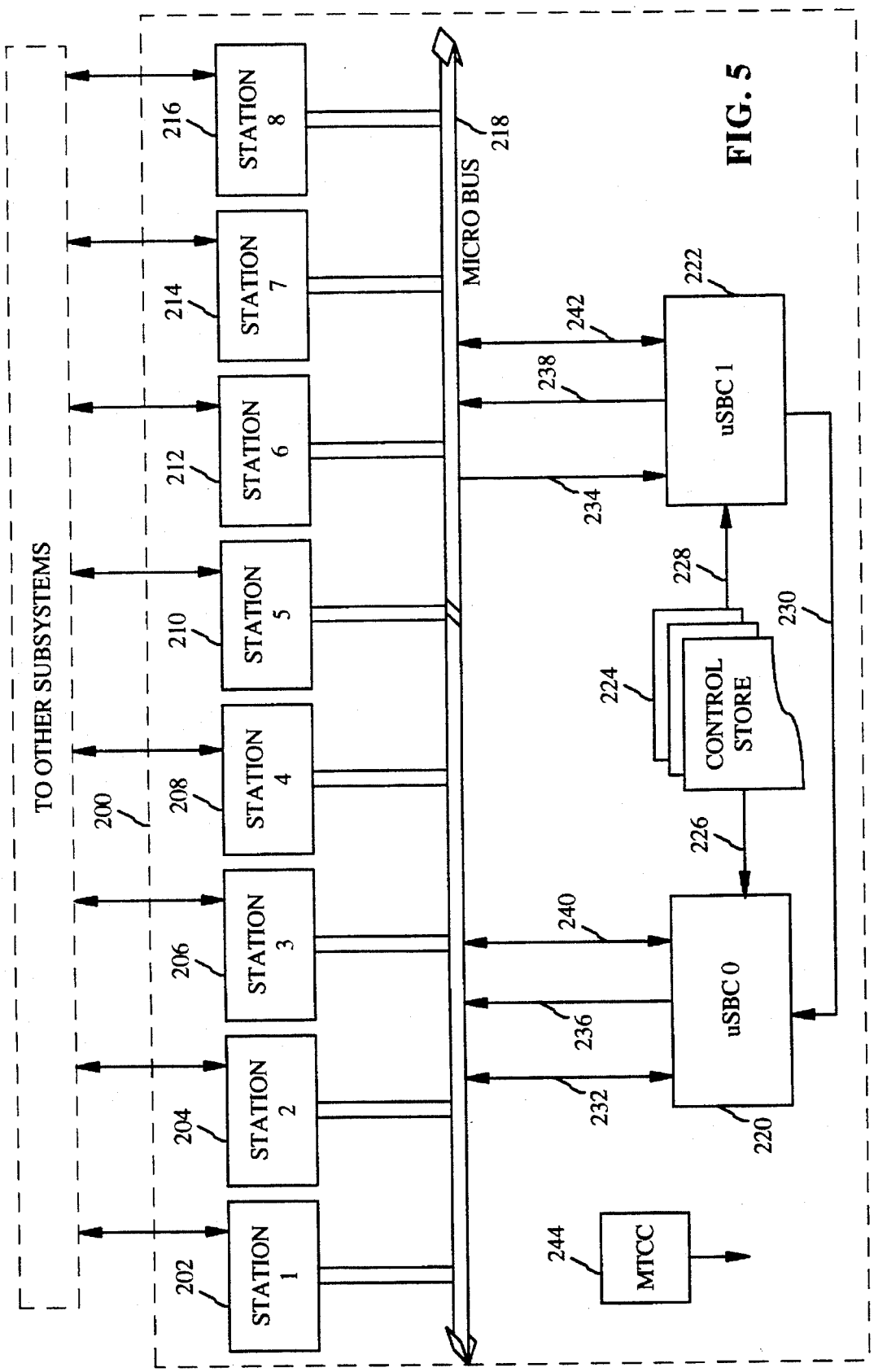
FIG. 5 is a block diagram of the Microsequencer Bus Controller System.

FIG. 5 is a block diagram of the Microsequencer Bus Controller System. The Microsequencer Bus Controller System 200 contains up to eight Stations 202, 204, 206, 208, 210, 212, 214, 216 connected to a bi-directional internal communication bus called the Micro Bus 218. A Station is a collection of logic implemented in a gate array on a VLSI part produced with CMOS 448 technology that performs specific functions. A Station is coupled to the Micro Bus 218 and also may interface with another bus, I/O mechanism, or subsystem that is external to the Microsequencer Bus Controller System. That is, it may read data from or write data to other hardware components in the File Cache System 18. In the preferred embodiment, there are ten different gate array designs representing Stations in the File Cache System. However, it is possible that any custom designed gate array supporting a set of required functions can fulfill the role of a Station and be connected to the Micro Bus 218.

The Micro Sequencer Bus Controller (uSBC) 0 220 and uSBC 1 222 are special purpose RISC microprocessors that control the operation of the Stations via the Micro Bus 218. The uSBCs execute an instruction stream that is stored in the Control Store 224, a high speed static random access memory (SRAM). The instruction stream is written into the Control Store 224 at system initialization time. The instruction stream is fetched by uSBC 0 220 from the Control Store 224 over Line 226. The same instruction stream is fetched by uSBC 1 222 from the Control Store 224 over Line 228. The first microprocessor, uSBC 0 220, is the master, and the second microprocessor, uSBC 1 222, is the slave. The master and slave execute the same instructions at the same time but only the master microprocessor writes data on the Micro Bus 218. Results of operations performed by the slave microprocessor uSBC 1 222 are forwarded over Line 230 to the master microprocessor uSBC 0 220, where they are compared with the results of operations performed by the master microprocessor uSBC 0 to detect any possible errors or loss of program control. The uSBCs connect to the Micro Bus 218 over three distinct sets of lines: Address Lines 232, 234, Data Lines 236, 238, and Control Lines 240, 242.

The Micro Bus 218 is a bi-directional bus used by the uSBCs to communicate with the Stations and for data transfer between Stations. It provides access from a uSBC to hardware registers and designators resident on a Station. The Maintenance Clock Control (MTCC) gate array 244 provides maintenance operations such as fault detection, clock distribution and control, and system reset/recovery for all components of the Microsequencer Bus Controller System 200. The MTCC drives a bus enable line, which allows the uSBCs 220, 222, and the Stations to drive data on the Micro Bus 218.

III. The Micro Bus

The Micro Bus 218 is a bi-directional bus which provides communication paths between the Microsequencer Bus Controllers (uSBCs) and the Stations. The Micro Bus consists of Data lines 232, Address lines 236, and various Control lines 240. The address portion of the bus is capable of addressing up to eight Stations. The Stations and the uSBCs transmit and receive data between themselves across the Micro Bus. The Micro Bus is adaptable to either a 36 bit data bus (DM), or a 32 bit data bus (HIA). The mode of parity checking on the Micro Bus is different depending on whether the data bus is supporting words of 36 bits or 32 bits.

The Micro Bus timing is defined in terms of the clock cycles it takes for the data transmitted on the bus to propagate from the transmitter to the receiver. This time is three machine clock cycles. Since a clock cycle on a Data Mover (DM) is 22.5 nanoseconds, the transmission time for a DM is 67.5 nanoseconds. Since a clock cycle on a Host Interface Adaptor (HIA) is 25 nanoseconds, the transmission time for a HIA is 75 nanoseconds.

A. Bi-directional Signals

Figure 6:
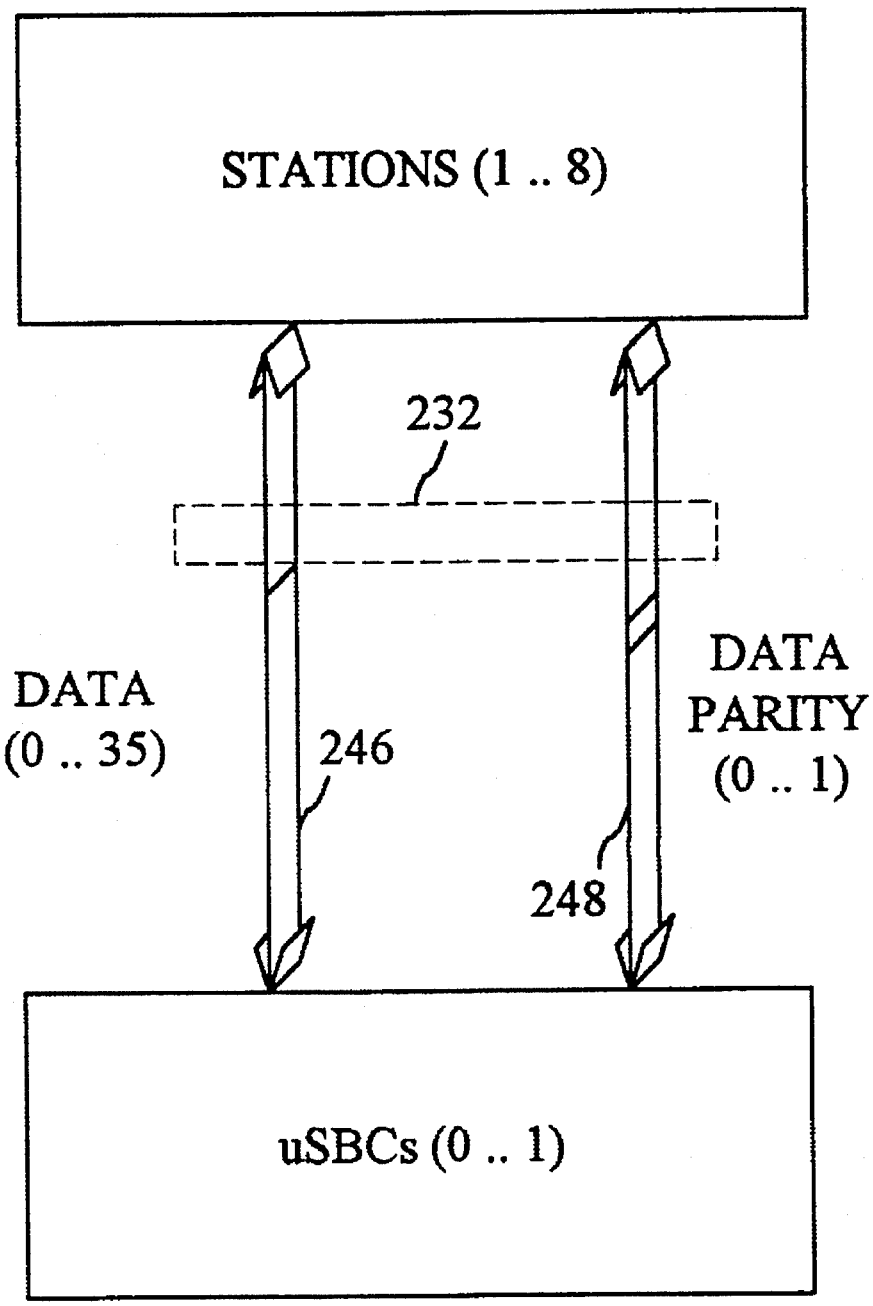
FIG. 6 is a block diagram illustrating the Data and Data Parity paths of the Micro Bus.
Figure 7:
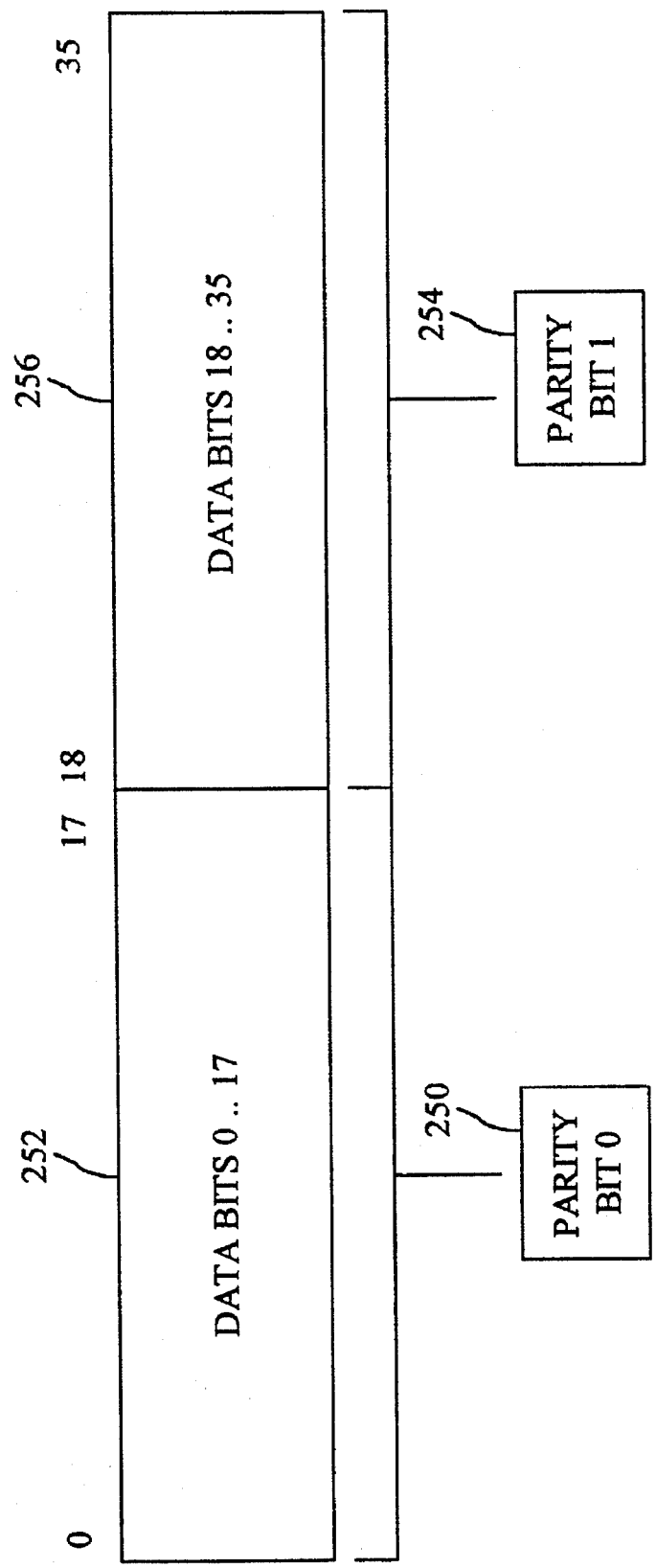
FIG. 7 shows the parity domain for the Data path of the Micro Bus when the Microsequencer Bus Controller System is a Data Mover.

FIG. 6 is a block diagram illustrating the Data and Data Parity paths of the Micro Bus. The Data path 246 between the uSBCs 220, 222, and the Stations 202, 204, 206, 208, 210, 212, 214, 216, consists of 36 bits. The Data Parity path 248 consists of two bits. Data and Data Parity can be sent from a uSBC to a Station, or from a Station to a Microsequencer Bus Controller (uSBC). FIG. 7 shows the parity domain for the Data path of the Micro Bus 218 when the Microsequencer Bus Controller System 200 is a Data Mover 48. The full 36 bits are used for data transfer purposes, with Data Parity Bit 0 250 representing the odd parity of Data bits 0–17 252, and Data Parity Bit 1 254 representing the odd parity of Data bits 18–35 256. Bit 0 in FIG. 7 is the most significant bit (MSB) and Bit 35 is the least significant bit (LSB).

Figure 8:
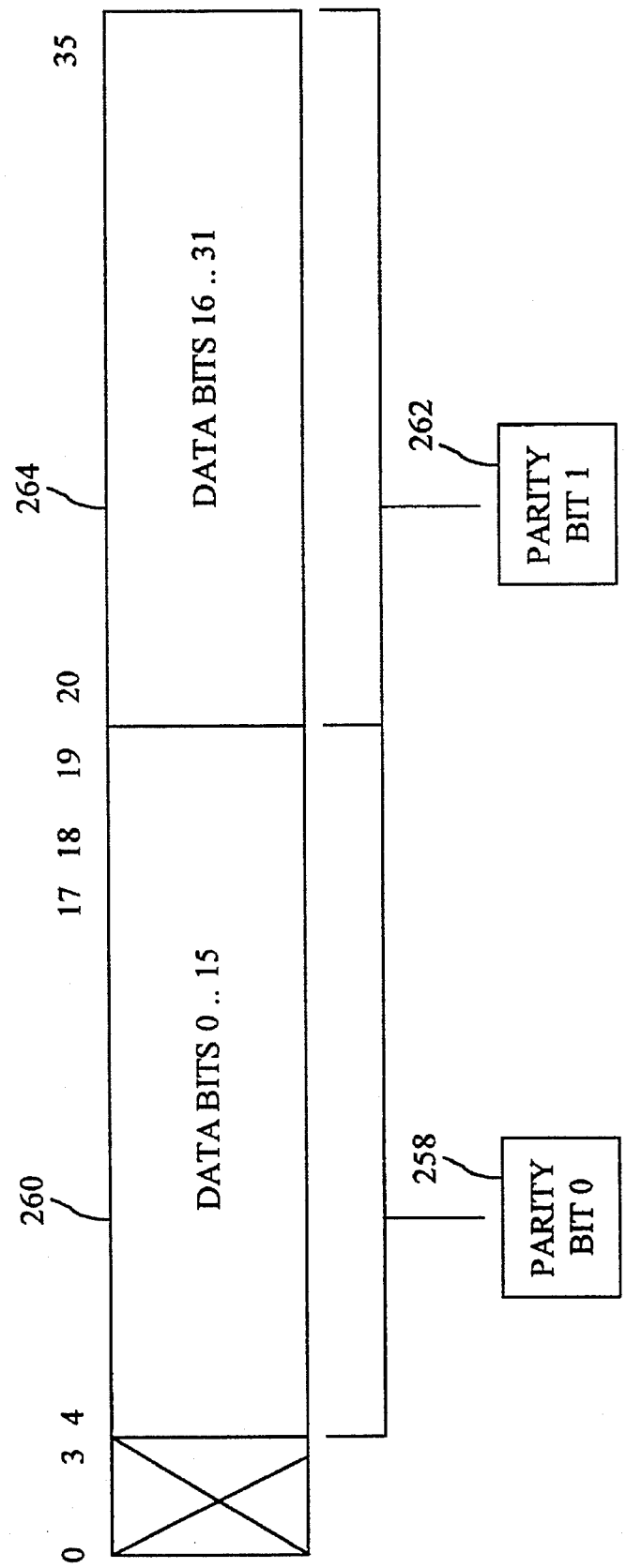
FIG. 8 shows the parity domain for the Data path of the Micro Bus when the Microsequencer Bus Controller System is a Host Interface Adaptor.

FIG. 8 shows the parity domain for the Data path of the Micro Bus 218 when the Microsequencer Bus Controller System 200 is a Host Interface Adaptor 52. Only 32 bits of the 36 bits available are used for data transfer purposes, with Data Parity Bit 0 258 representing the odd parity of original Data bits 4–19 260, and Data Parity Bit 1 262 representing the odd parity of Data bits 20–35 264. Thus, the 36-bit transfer is mapped onto a 32-bit representation. Bit 4 in FIG. 8 is the MSB, and Bit 35 is the LSB.

B. Signals From A uSBC To A Station

1. Address and Address Parity Signals

Figure 9:
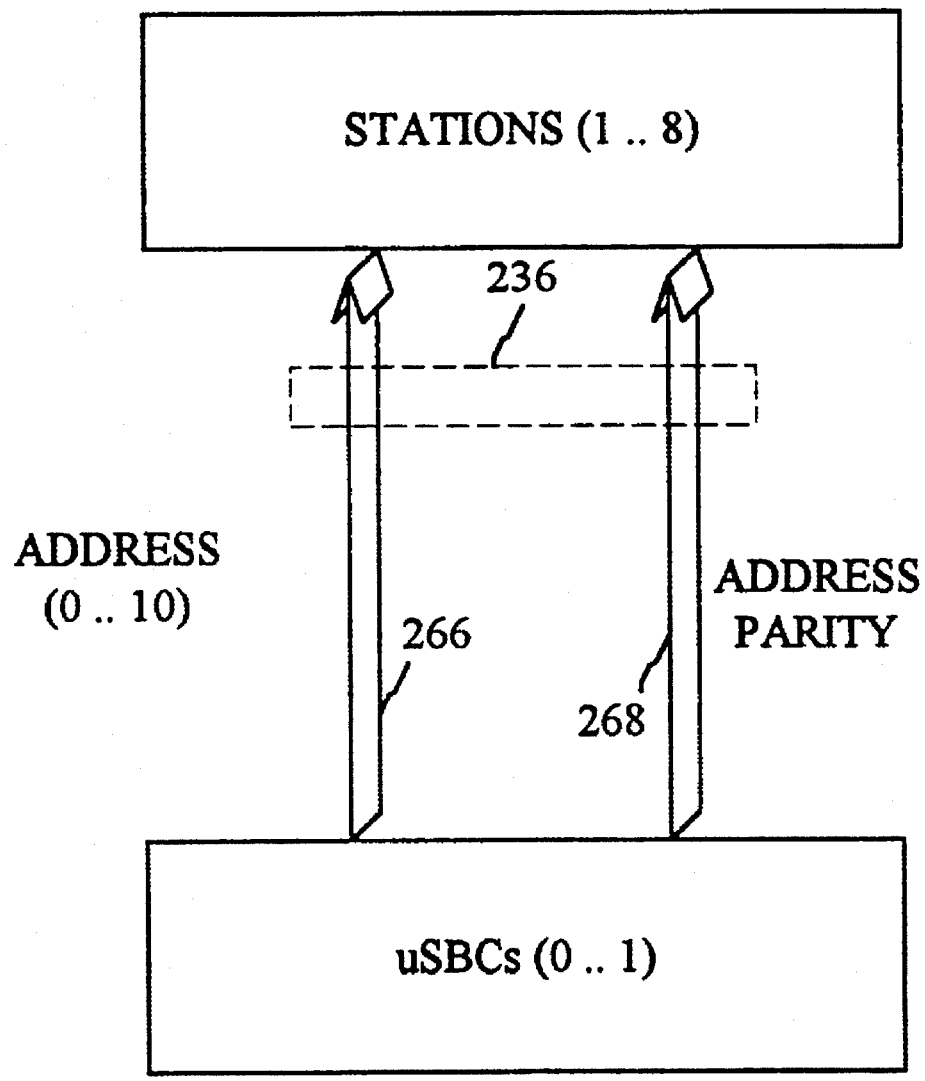
FIG. 9 is a block diagram illustrating the Address and Address Parity paths of the Micro Bus.

FIG. 9 is a block diagram illustrating the Address and Address Parity paths of the Micro Bus. Each Microsequencer Bus Controller (uSBC) can independently put 11 bits of Address 266 onto the Micro Bus 218 to select a Station and register from which to read data or write data. For bus driving reasons, each uSBC drives four Stations. USBC 0 220 drives the addresses for Stations 1, 2, 3, and 4, labelled 202, 204, 206, and 208, respectively, and uSBC 1 222 drives the addresses for stations 5, 6, 7, and 8, labelled 210, 212, 214, 216 respectively. An Address Parity bit 268 corresponding to each Address is also put onto the Micro Bus. This Address Parity bit represents the odd parity of the Address 266.

Figure 10:
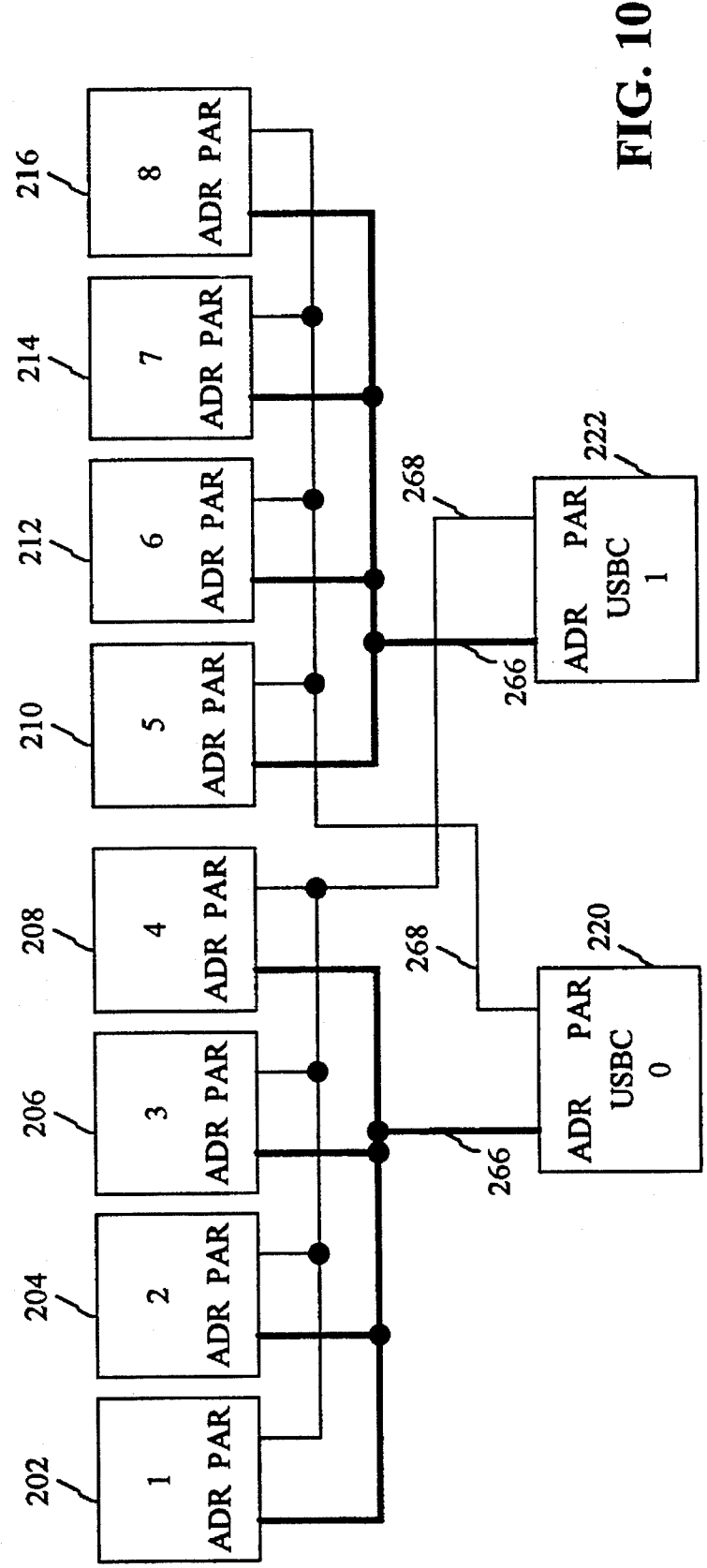
FIG. 10 is a block diagram showing how the parity domains for the Addresses on the Micro Bus are distributed.

FIG. 10 is a block diagram showing how the parity domains for the Addresses on the Micro Bus are distributed. USBC 0 220 addresses the four Stations as shown. Although uSBC 0 is actually sending the address to those four Stations, uSBC 1 222 simultaneously generates the same address that uSBC 0 220 is outputting (recall that the uSBCs execute the same microcode instruction stream at the same time). USBC 1 222 computes the Address Parity bit 268 for Stations 1, 2, 3, and 4, labelled 202, 204, 206, 208, respectively. Similarly, uSBC 0 220 computes the Address Parity bit 268 for Stations 5, 6, 7, and 8, labelled 210, 212, 214, and 216, respectively, that are addressed by uSBC 1 222.

Figure 11:
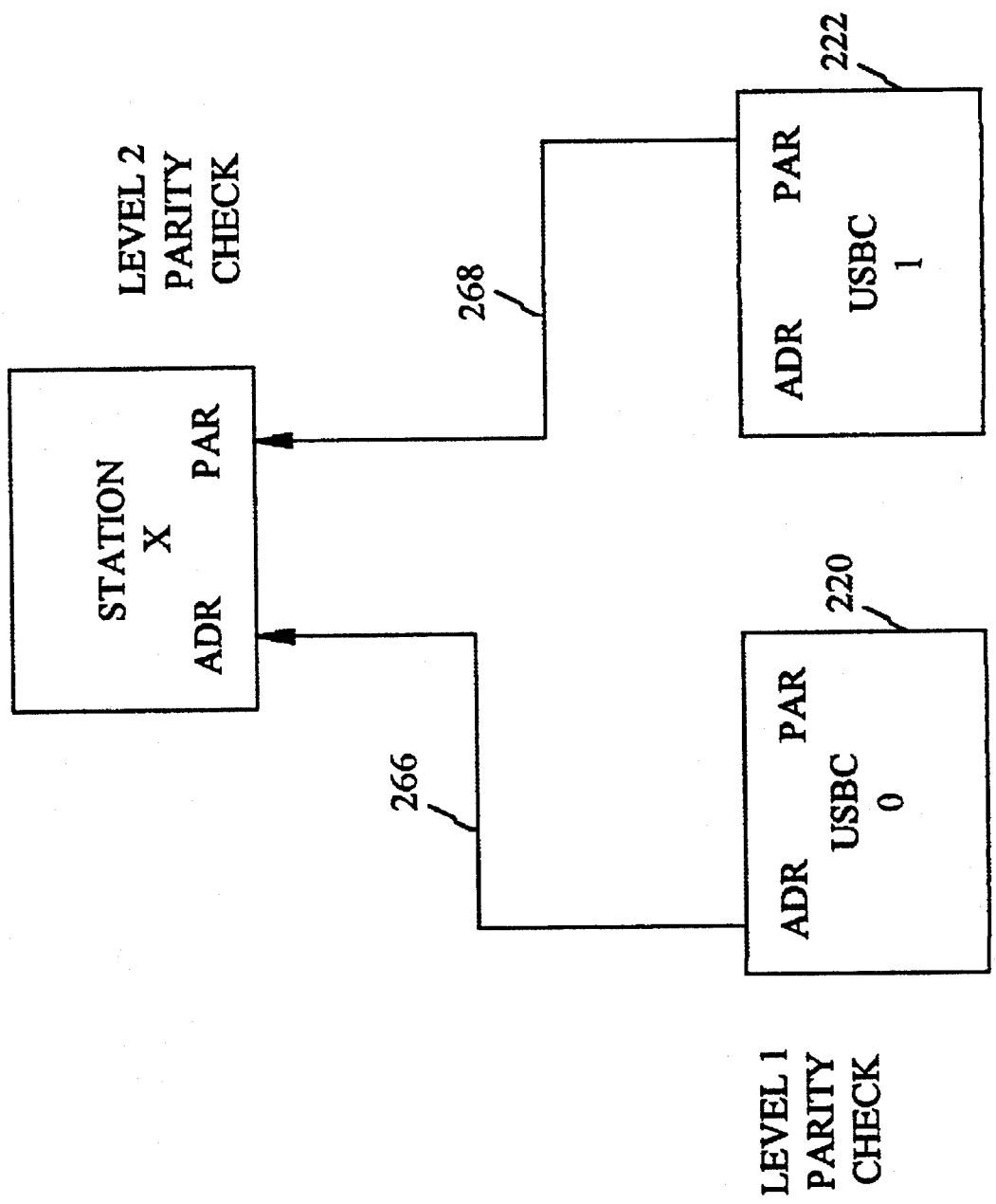
FIG. 11 is a block diagram showing the two levels of Address Parity checking performed by the Microsequencer Bus Controller System.

This alternative parity checking scheme provides an extra level of parity checking between the dual microprocessors. FIG. 11 is a block diagram showing the two levels of Address Parity checking performed by the Microsequencer Bus Controller System 200. At Level 1, the Address Parity is generated within uSBC 0 220 and checked to determine if the Address has been generated correctly. A parity error will occur if the Address has not been generated correctly. When this occurs, the uSBC blocks the transmission of data to the desired Station. At Level 2, a parity check is performed at the receiving Station to determine if the Address it received was correct. Thus, while Level 1 checks for Address "generation" errors, Level 2 checks for Address "transmission" errors, or logical errors caused by the uSBCs getting out of synchronization with each other.

This Level 2 parity checking is accomplished by requiring uSBC 1 222 to generate the same Address 266 that uSBC 0 220 generates. USBC 1 222 generates an Address Parity 268 from the Address and sends it to the Station that uSBC 0 220 has addressed. The Station then determines whether an Address Parity error has occurred by comparing the Address 266 it received from uSBC 0 220 with the Address Parity bit 268 it received from uSBC 1 222. This parity distribution scheme provides for an extra level of security for detecting Address transmission errors.

Figure 12:
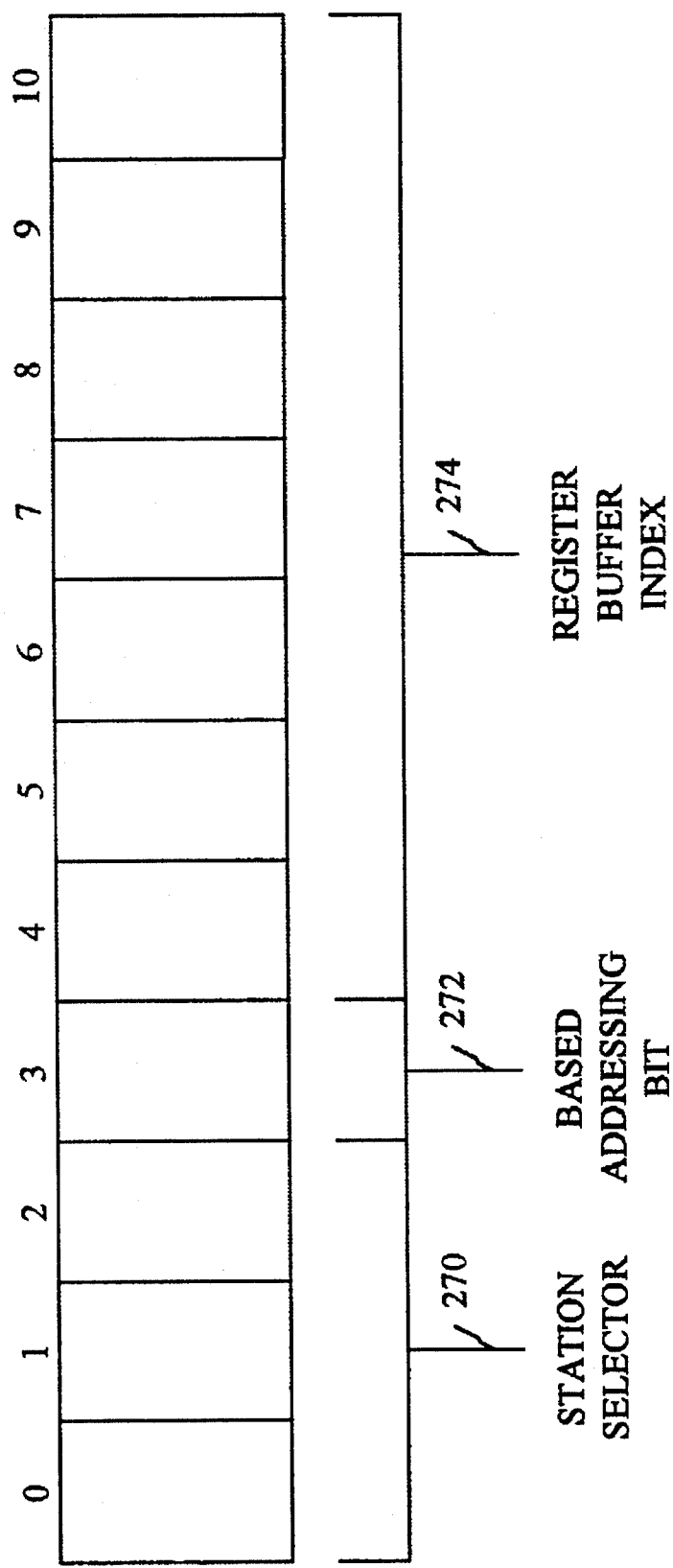
FIG. 12 shows the format of an Address for the Micro Bus.

FIG. 12 shows the format of an Address for the Micro Bus 218. The Station Selector field 270, stored in bits 0–2, is used to address one of the eight Stations. The Based Addressing Bit field 272, stored in bit 3, is used to select one of two possible modes of operation: Direct addressing, when clear, or Based addressing, when set. Direct addressing is used to address registers and designators on a Station that do not have a particular addressing structure. Direct addressing allows for up to 128 registers and/or designators if the station is designed to accommodate both Direct and Based addressing modes. If the Station does not have Based addressing mode, then up to 256 registers and/or designators can be addressed. Based addressing is used to reference register stacks, and allows addressing of buffers up to 128 registers deep. Since the Micro Bus 218 is either 32 or 36 bits wide, the number of possible addressable registers on a Station could be as high as 2*N, where N is either 32 or 36 as applicable. The Register Buffer Index field 274, stored in bits 4–10, indicates which register or designator to reference within the selected Station.

2. Source Signals

Figure 13:
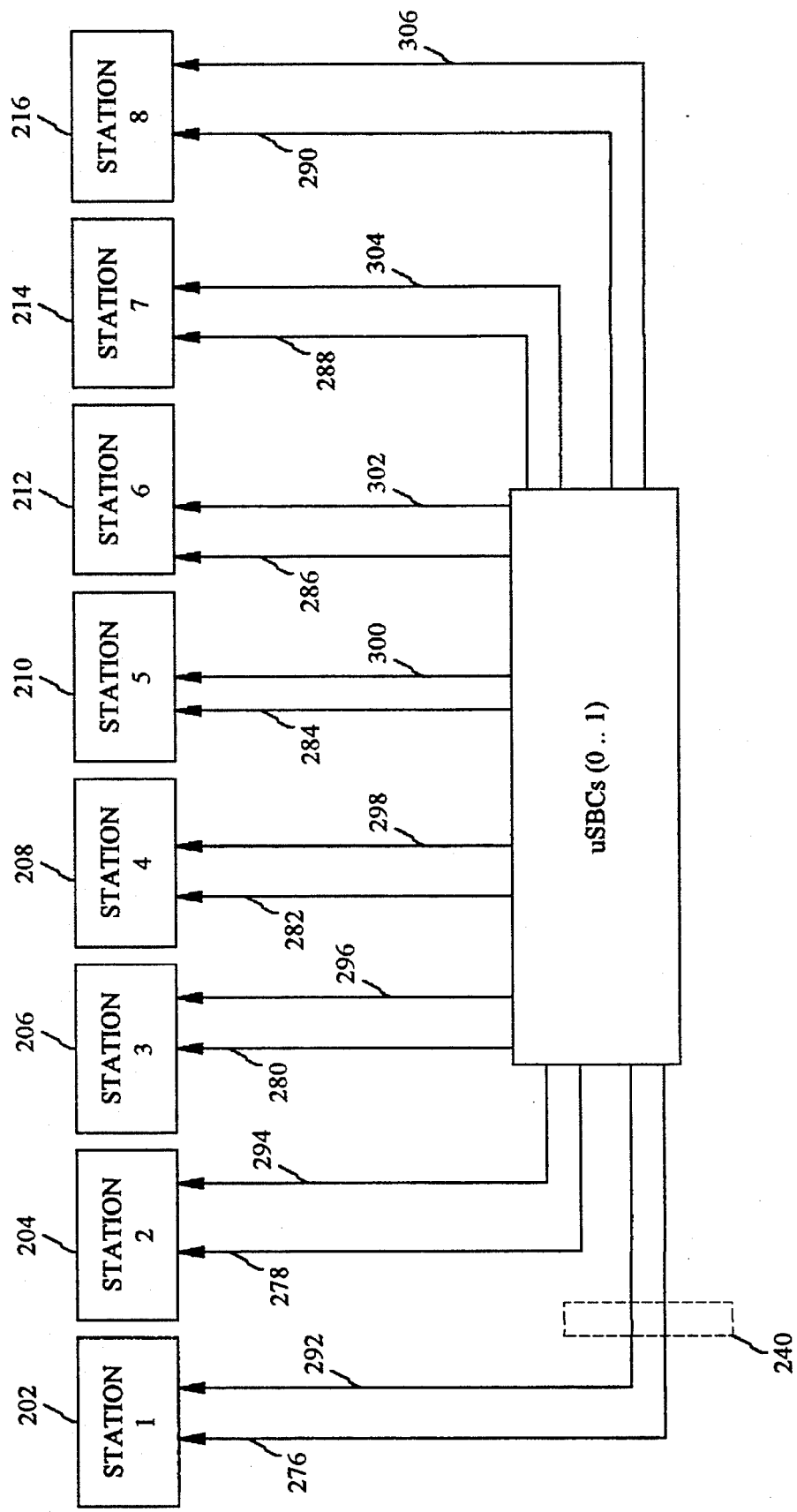
FIG. 13 is a block diagram illustrating the Source and Bus Busy signals of the Micro Bus.

FIG. 13 is a block diagram illustrating the Source and Bus Busy signals of the Micro Bus. There are eight Source (SRC) signals 276, 278, 280, 282, 284, 286, 288, and 290; one for each Station. A SRC signal is generated by a uSBC when it executes an instruction that fetches the instruction operand from a register or designator located on a Station.

3. Bus Busy Signals

FIG. 13 shows the Source and Bus Busy signals of the Micro Bus. There are eight Bus Busy signals 292, 294, 296, 298, 300, 302, 304, and 306; one for each Station. Bus Busy signals are activated by a uSBC when it is executing a SRC instruction. All Stations receive a Bus Busy signal except the station that was addressed by the SRC instruction. This signal indicates to the Station that it cannot transmit data because the Micro Bus 218 is currently in use. In this way, the uSBCs ensure that Stations not being addressed by the SRC instruction do not accidentally (because of hardware malfunction) transmit data on the Micro Bus.

4. Data Destinate Signals

Figure 14:
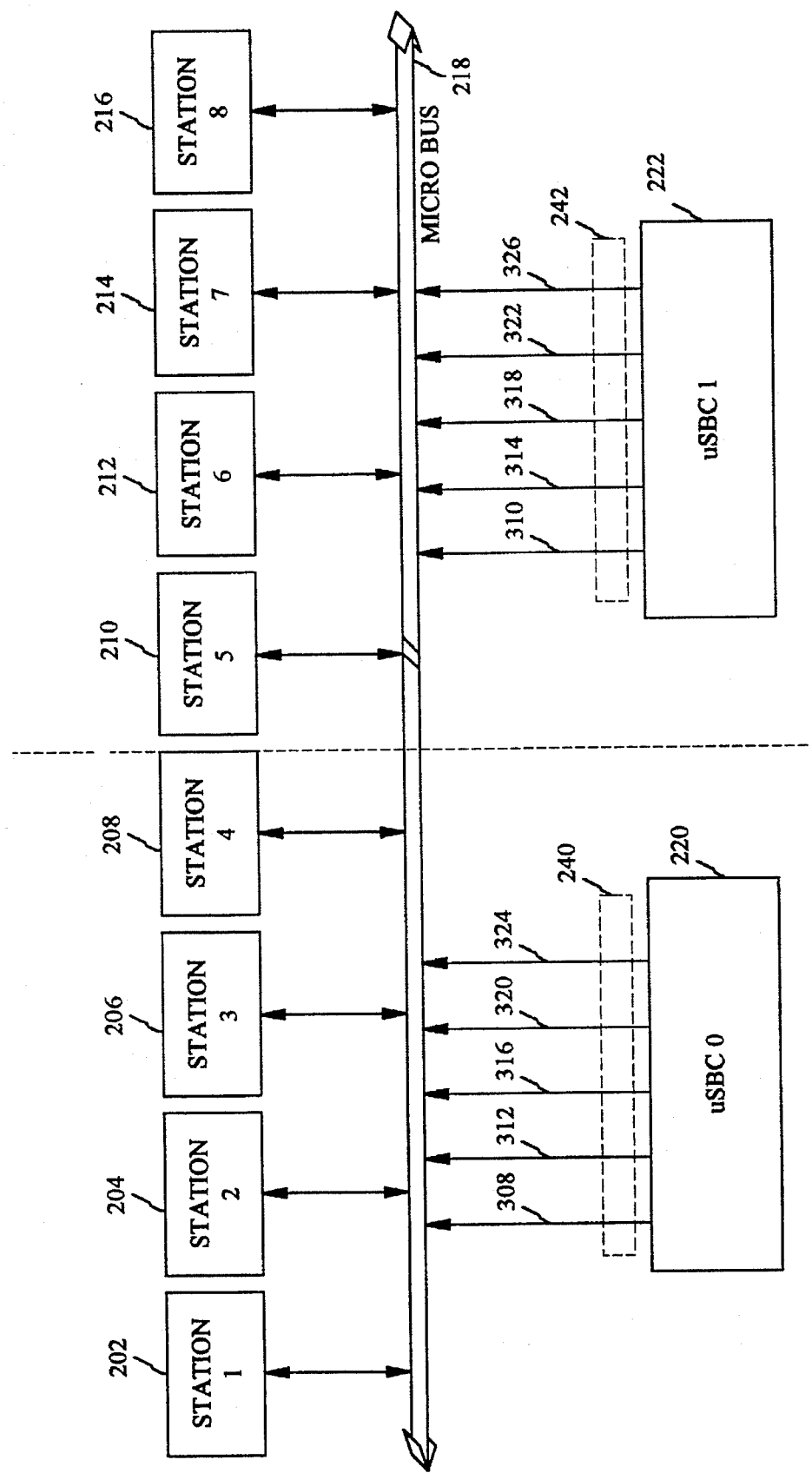
FIG. 14 is a block diagram illustrating five control signals that are output from the Microsequencer Bus Controllers to the Micro Bus.

FIG. 14 is a block diagram illustrating five control signals that are output from the Microsequencer Bus Controllers to the Micro Bus. There is one Data Destinate (DST) signal output from each uSBC. USBC 0 220 drives Stations 1, 2, 3, and 4, labelled 202, 204, 206, 208 respectively, with Data Destinate signal 308. USBC 1 222 drives Stations 5, 6, 7, 8, labelled 210, 212, 214, 216, respectively, with Data Destinate signal 310. The Data Destinate signal is activated by a uSBC when it is executing an instruction that stores data in a register or designator within a Station. It indicates to the Station that the uSBC is going to send that Station some data over the Data path.

5. Latch Set Signals

Also shown on FIG. 14, is one Latch Set signal output from each Microsequencer Bus Controller (uSBC). USBC 0 220 drives Stations 1, 2, 3, and 4, labelled 202, 204, 206, and 208 respectively, with Latch Set signal 312. USBC 1 222 drives Stations 5, 6, 7, and 8, labelled 210, 212, 214, and 216, respectively, with Latch Set signal 314. The Latch Set signal is generated by a uSBC when it executes a Set/Clear (STCL) instruction which sets the state of a designator located on a Station.

6. Latch Clear Signals

There is one Latch Clear signal output from each Microsequencer Bus Controller (uSBC). USBC 0 220 drives Stations 1, 2, 3, and 4, labelled 202, 204, 206, and 208, respectively, with Latch Clear signal 316. USBC 1 222 drives Stations 5, 6, 7, and 8, labelled 210, 212, 214, and 216, respectively, with Latch Clear signal 318. The Latch Clear signal is generated by a uSBC when it executes a Set/Clear (STCL) instruction which clears the state of a designator located on a Station.

7. Branch On External Condition Signals

There is one Branch On External Condition signal output from each Microsequencer Bus Controller (uSBC). USBC 0 220 drives Stations 1, 2, 3, and 4, labelled 202, 204, 206, and 208, respectively, with Branch On External Condition signal 320. USBC 1 222 drives Stations 5, 6, 7, and 8, labelled 210, 212, 214, and 216, respectively, with Branch On External Condition signal 322. The Branch On External Condition signal is generated by a uSBC when it executes a External Branch (BRCH) instruction which tests the state of an addressed designator located on a Station. The state of the designator tested is used to determine whether a branch is taken during the execution of the instruction stream.

8. Lock Bus Signals

Finally on FIG. 14, there is shown one Lock Bus signal output from each Microsequencer Bus Controller (uSBC). USBC 0 220 drives Stations 1, 2, 3, and 4, labelled 202, 204, 206, and 208, respectively, with Lock Bus signal 324. USBC 1 222 drives Stations 5, 6, 7, and 8, labelled 210, 212, 214, and 216, respectively, with Lock Bus signal 326. The Lock Bus signal is generated by a uSBC to prevent any Station from accessing the Micro Bus 218.

C. Signals From A Station To A uSBC

1. Continue Signals

Figure 15:
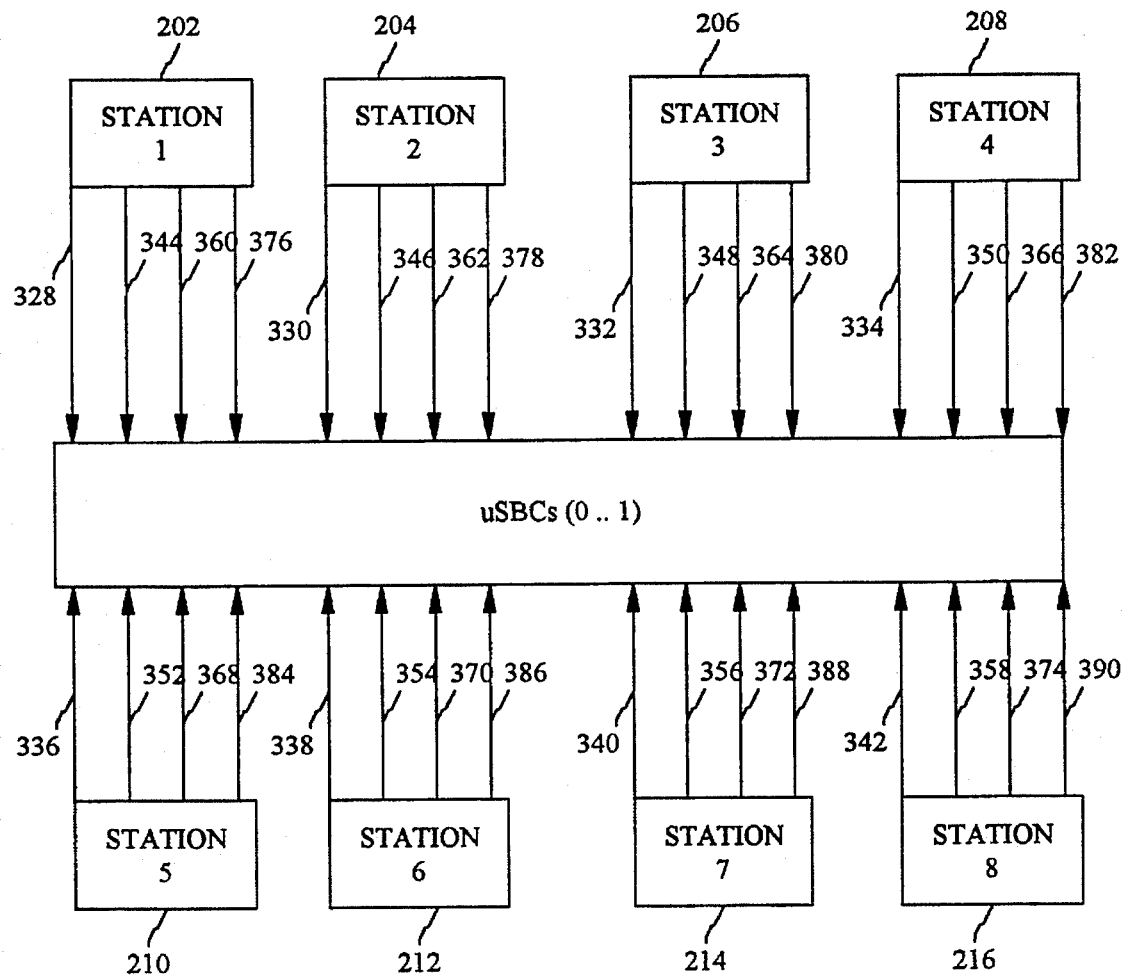
FIG. 15 is a block diagram illustrating four control signals output from each Station to the Microsequencer Bus Controllers.

FIG. 15 is a block diagram illustrating four control signals output from each Station to the Microsequencer Bus Controllers. Each Station outputs a Continue signal, which is similar to an "acknowledge" signal. Stations 202, 204, 206, 208, 210, 212, 214, and 216, output Continue signals 328, 330, 332, 334, 336, 338, 340, and 342, respectively. Continue signals are used in two situations. The first is when a uSBC sends data to the Stations (via a Data Destinate signal 310). When the data has been received by the Station, the Station activates the Continue signal. The second is when a uSBC requests data from the Station (via a Source signal). When the data is ready to be read, the Station activates the Continue signal. The Continue signal also locks out other Station activity while a selected Station performs a task. The uSBCs simultaneously monitor the Continue signals from each Station to detect erroneous signals, and the uSBCs will halt all operations upon detection of erroneous Continue signals.

2. External Branch Condition Signals

As illustrated on FIG. 15, each Station also outputs an External Branch Condition signal. Stations 202, 204, 206, 208, 210, 212, 214, and 216, output External Branch Condition signals 344, 346, 348, 350, 352, 354, 356, and 358, respectively. The External Branch Condition signal indicates the logic level of the designator specified by the Address 266. If the addressed designator is set, the External Branch Condition signal is a logic low, and if the addressed designator is clear, the signal is a logic high. The External Branch Condition signal allows the uSBC to determine which path to take when the uSBC is executing a conditional External Branch instruction.

3. Station Abort Signals

Each Station also outputs an Station Abort signal. Stations 202, 204, 206, 208, 210, 212, 214, and 216, output Station Abort signals 360, 362, 364, 366, 368, 370, 372, and 374, respectively. The Station Abort signal is generated by logic within each Station upon the detection of a hardware failure. The logic detects when a failure occurs which causes the Micro Bus 218 to attempt to receive and transmit data simultaneously. It also detects when an incorrect Station has been addressed or an incorrect address within a Station has been specified, either of which would result in erroneous data being sent or received on the Micro Bus 218. If any errors occur, the uSBCs disable the Data paths 246 to prevent component damage and prevent faulty data from being transmitted on the Micro Bus 218.

Figure 16:
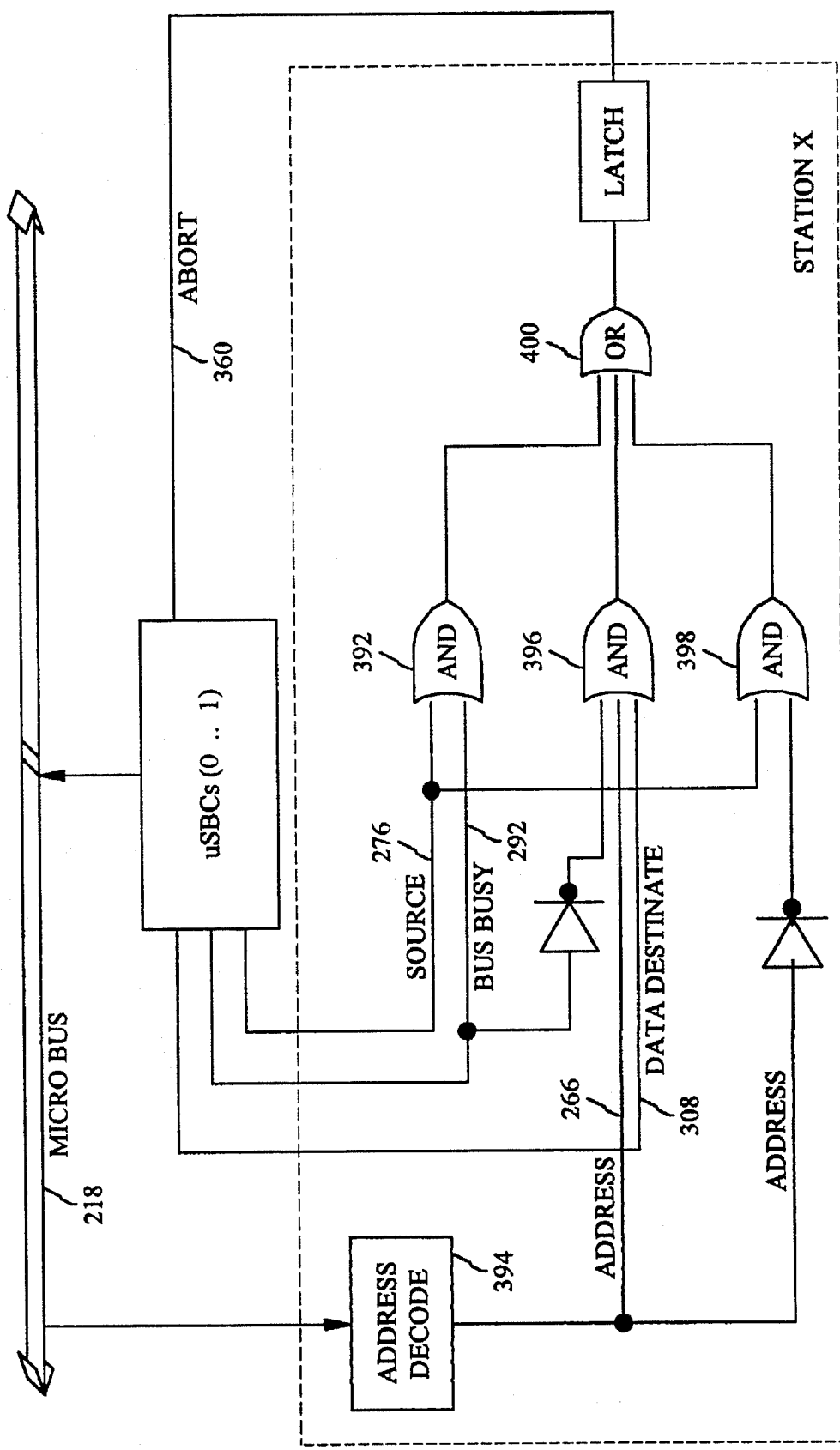
FIG. 16 is a diagram of the Station Abort detection logic.

FIG. 16 is a diagram of the Station Abort detection logic. There are three conditions that will cause a Station Abort signal 360 to be activated. The first is the detection of an active Source signal 276 and an active Bus Busy signal 292. The Station Abort logic determines if the Station is sourcing dam at the same time that one of the other Stations or one of the uSBCs has put some data on the Micro Bus 218. If the Station is trying to source data when the Micro Bus is busy, then two different Stations would be trying to simultaneously access the Micro Bus, and there would be a conflict. This error is detected by coupling the Source signal 276 and the Bus Busy signal 292 to an "AND" gate 392.

The second condition is the detection of an inactive Bus Busy signal 292 and an active Data Destinate signal 308, when Address 266 (decoded by Address Decode logic 394) was addressing that Station. To receive data, the Micro Bus 218 must show that it is active on the Bus Busy signal, because for a Station to receive data, there must be some data on the Micro Bus for the Station to receive when that Station is being addressed. Note that the Bus Busy signal must be at the opposite logic level as it was when the Source signal is present. There must be nothing on the Micro Bus 218 when the Source signal 276 is activated because a Station is attempting access to the Micro Bus. Conversely, there must be some data on the Micro Bus when the Data Destinate signal 308 is activated, because a Station is attempting to receive data. This error is detected by coupling the Address 266, the Data Destinate signal 308, and the inversion of the Bus Busy signal 292 to an "AND" gate 396.

The third condition is the occurrence of a Source signal 276 when Address 266 was not addressing that Station. The Station Abort logic determines whether the Station has been requested to Source data when the Station has not been addressed. If the Station has been requested to Source data when the Station has not been addressed, a failure in either the internal addressing of the uSBCs, or a failure in the addressing of the Micro Bus 218 has occurred. This error is detected by coupling the Source signal 276 with the inversion of the Address 266 to an "AND" gate 398. The results of the three error checks are coupled to an "OR" gate 400 to detect any one of the three errors. This result is output as the Station Abort signal 360.

4. Station Error Signals

Referring back to FIG. 15, each Station outputs an Station Error signal. Stations 202, 204, 206, 208, 210, 212, 214, and 216, output Station Error signals 376, 378, 380, 382, 384, 386, 388, and 390, respectively. The Station Error signal is generated by a Station upon detection of a failure in the hardware related to the Micro Bus Station control.

IV. The Control Store

Referring back to FIG. 5, the Control Store 224 is used to store the instructions that are executed by uSBC 0 220 and uSBC 1 222. These instructions are 44 bits wide. The Control Store 224, although in reality a RAM, is used as a read-only memory (ROM). A Control Store consists of seven SRAM chips. Each SRAM holds 32*1024 (K) 8-bit bytes of data. Each unit of data stored in a Control Store consists of 44 bits of instruction, 8 bits of parity for the instruction, and 2 bits of address bit parity (one bit for even address drivers, one bit for odd address drivers). Since there are seven SRAMs, each holding 8 bits per byte, a total of 56 bits is available for storage of each storage unit if part of each storage unit is stored in each of the seven SRAMs.

The Control Store 224 is loaded with instructions at system initialization time by a support computer system through a maintenance path (not shown). The parity bits and address bits are computed by the Host computer system 12 and appended to each instruction as it is stored. Later, as uSBC 0 220 and uSBC 1 222 are executing instructions, each instruction is fetched from the Control Store and parity values are computed from it. Each uSBC compares the parity values computed by it against the parity checks stored in the Control Store. If there are any discrepancies, the Control Store is assumed to be corrupted and an internal check condition is raised in the uSBC. This is a fatal error for uSBC processing. The error is reported to the MTCC 244 and processing is halted.

V. The Microsequencer Bus Controller

The Microsequencer Bus Controller (uSBC) is a special purpose microprocessor that executes instructions to monitor and control the transfer of data within the Microsequencer Bus Controller System 200. Refer to FIG. 5. There are two uSBCs in the system to ensure that all data manipulations are verified with duplex checking. One is considered to be the master 220, and the other the slave 222. Only the master uSBC 220 drives the Data on the Micro Bus 218, but both master and slave uSBCs drive Address 236, 238, and Control 240, 242, signals to lower the loading on the Micro Bus 218. The slave uSBC 222 sends the results of each instruction to the master uSBC 220 on a separate Line 230.

The master uSBC then compares this value to the result it computed. If the values are different, an internal check error condition has occurred. Program control has been lost. This is a fatal error that is reported to the MTCC 244. The uSBC processing is halted because of the error.

The uSBCs 220, 222, interface with the Micro Bus 218 over three separate sets of lines. Refer again to FIG. 5. The Address lines 236, 238, contain 11 bits. The Data lines 232, 234, contain 36 bits plus 2 parity bits if the Microsequencer Bus Controller System 200 is a Data Mover (DM) 48. The Data lines contain 32 bits plus 2 parity bits if the Microsequencer Bus Controller System is a Host Interface Adaptor (HIA) 52. The Control lines 240, 242, contain 11 bits. Notice that the uSBCs, although connected to the Micro Bus, are not considered to be Stations. Furthermore, the slave uSBC has its transmitters disabled, thus it can only receive data from the Micro Bus 218.

The uSBCs also interface with the MTCC 244 for initialization and maintenance functions, and clock circuitry to receive signals that control the sequential elements of the uSBC.

A. uSBC Architecture

Figure 17:
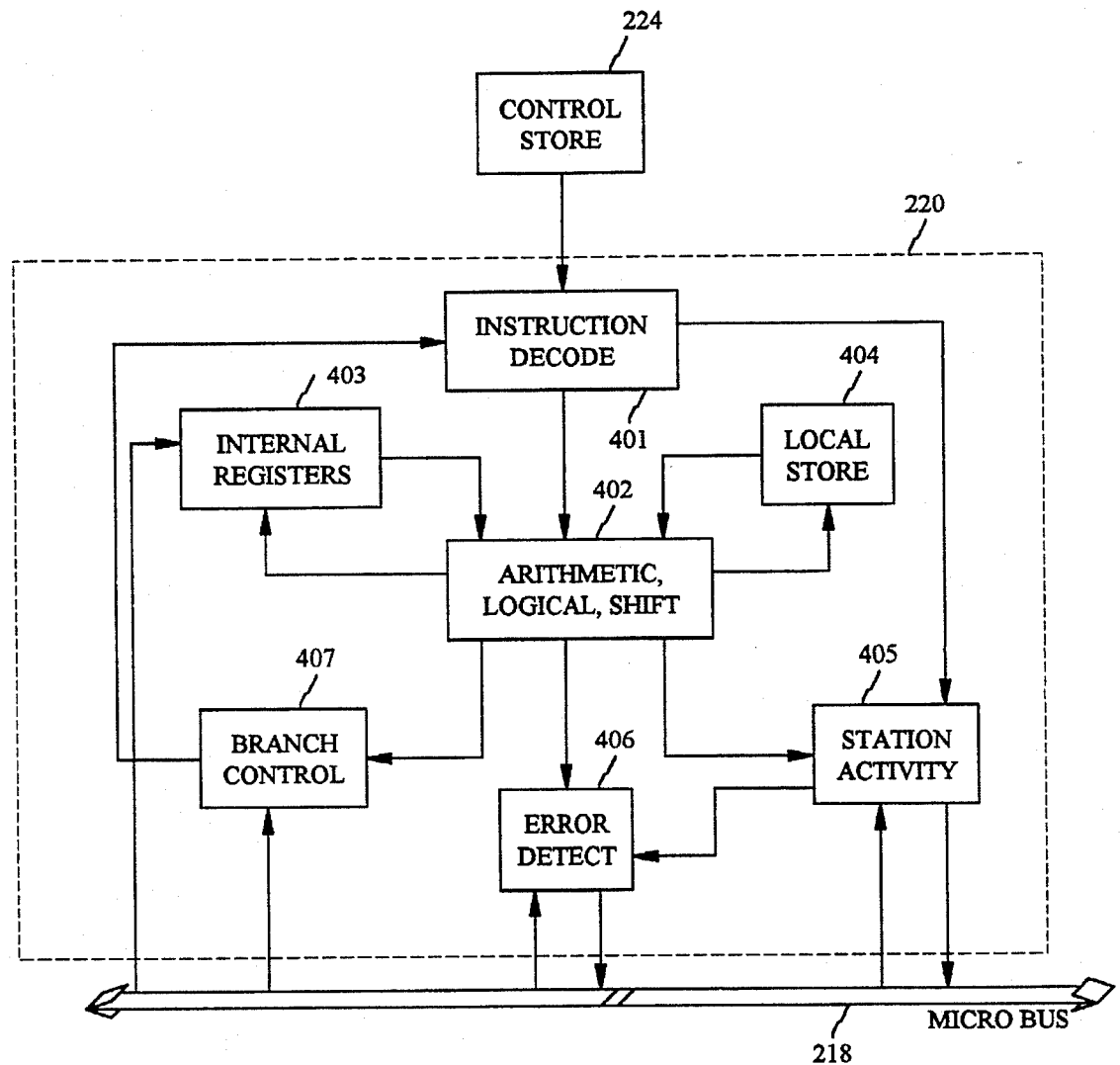
FIG. 17 is a block diagram of the main components of the Microsequencer Bus Controller.

FIG. 17 is a block diagram of the main components of the Microsequencer Bus Controller. The Instruction Decode logic 401 fetches instructions from the Control Store 224 and decodes the instruction to determine which command is requested, what operands the command is to be executed with, and which one of the Stations, if any, operands are to be fetched from or the result is to be written to. The Arithmetic, Logical, and Shift logic 402 performs the requested command by executing arithmetic, logical, or shift operations on the operands. The operands are fetched from one or more Internal Registers 403 or a Local Store memory 404. The result of the command execution is forwarded to Station Activity logic 405, which controls the operation of the Micro Bus 218, and to Error Detect logic 406, which detects any internal or slave microprocessor errors. Finally, Branch Control logic 407 determines the flow of instruction control by examining signals received from Stations over the Micro Bus 218 and the results of the Arithmetic, Logical, and Shift 402 command execution.

Figure 18:
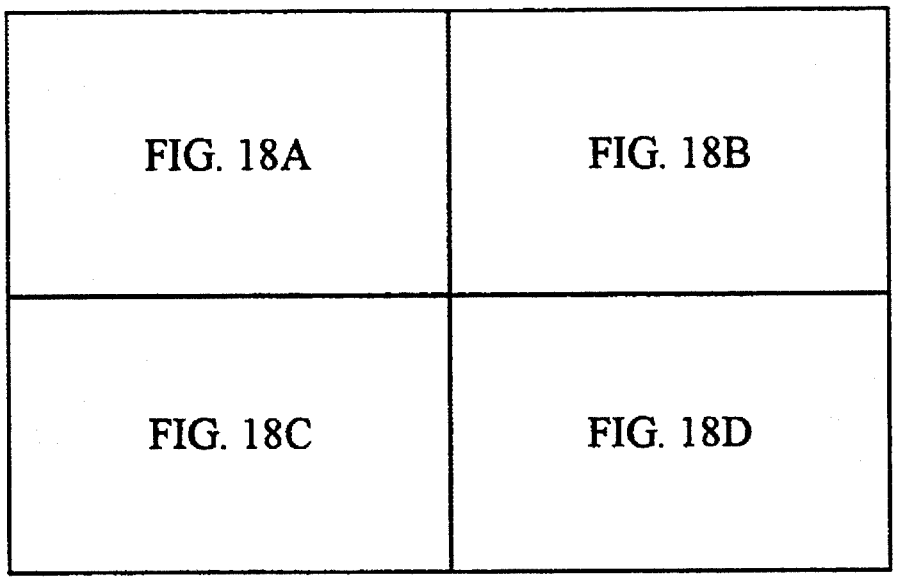
FIG. 18, comprising
Figure 18A:
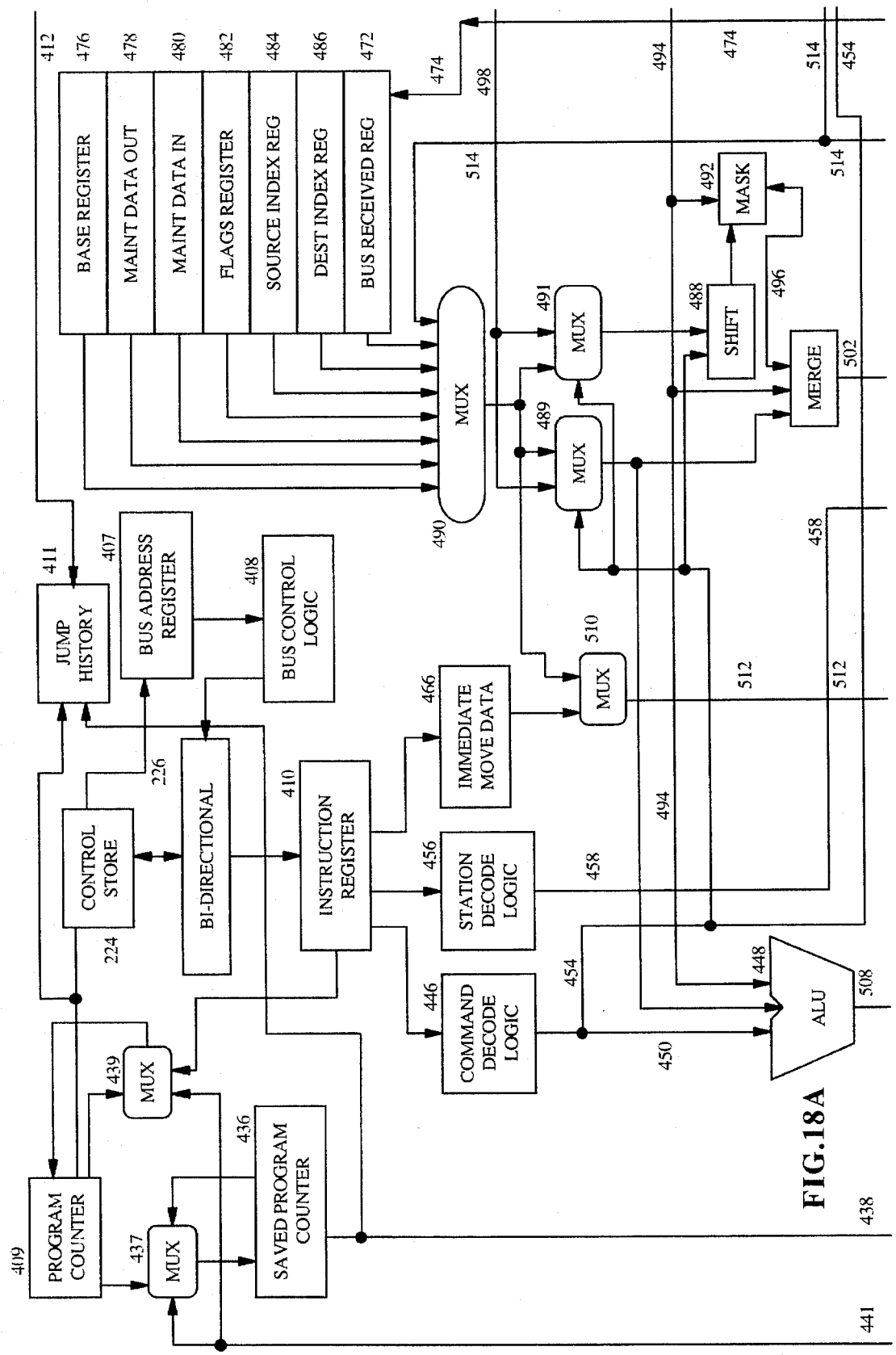
FIG. 18(A) through FIG. 18(D), is a detailed diagram illustrating the architecture of a Microsequencer Bus Controller.
Figure 18B:
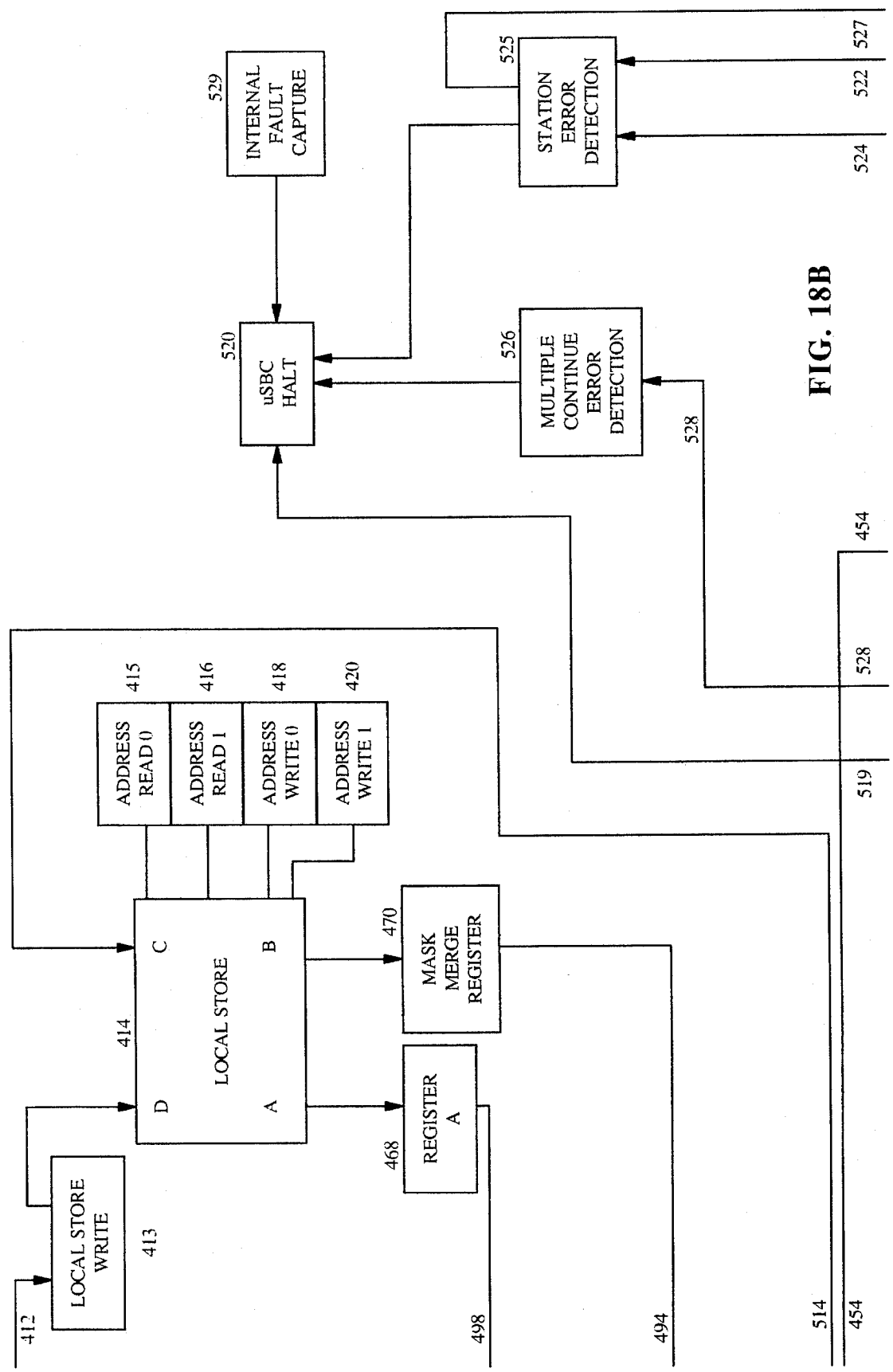
Figure 18C:
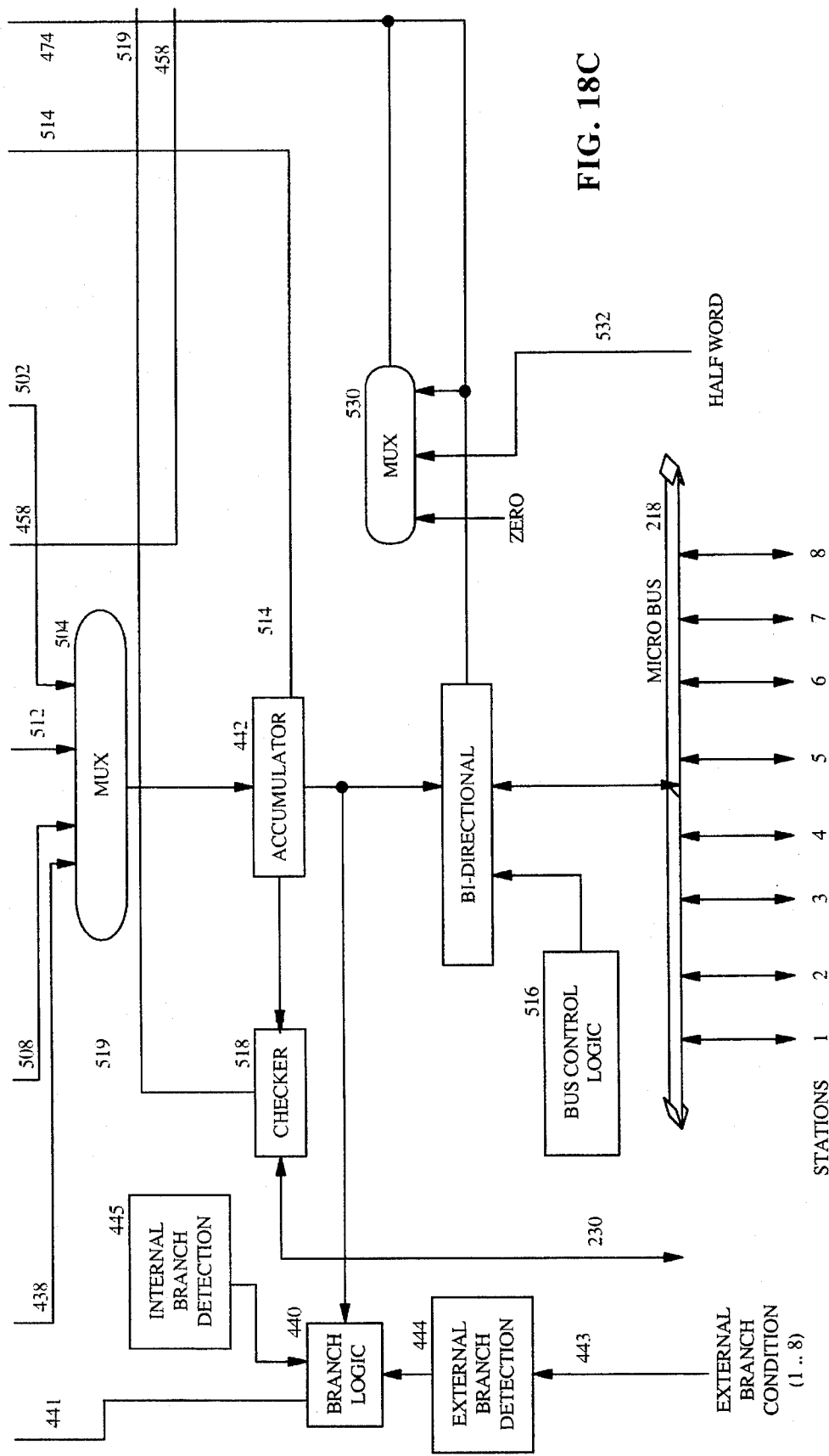
Figure 18D:
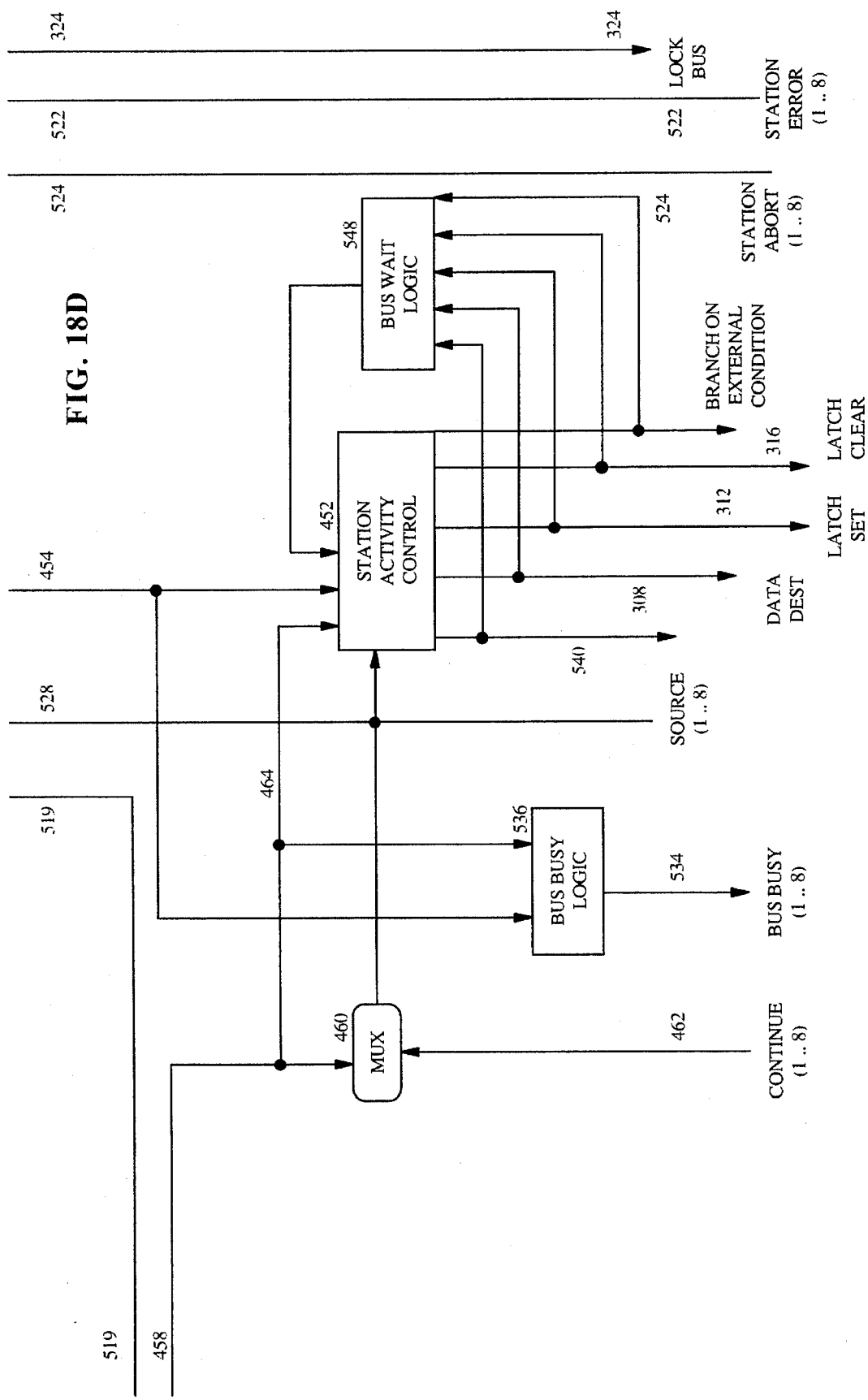

FIG. 18, comprising FIG. 18A through FIG. 18D, is a detailed diagram illustrating the architecture of a Microsequencer Bus Controller. The Control Store 224 holds the instructions to be executed by the uSBC. The Control Store 224 is accessed by the uSBC via Bi-Directional Line 226, which is controlled by Bus Control Logic 408. The Bus Address Register 407 holds the address of the designator specified by the instruction, if any. The Program Counter 409 is a register that holds the address of the instruction to be fetched from the Control Store 224. The instruction is retrieved from the indicated position in the Control Store 224 and stored in the Instruction Register 410 for subsequent processing. For most instructions, the Program Counter 409 is then incremented to address the next instruction in the Control Store to execute. Multiplexor (MUX) 439 controls the input to the Program Counter 409. Input is accepted from the Program Counter itself, the Instruction Register 410, and Branch Logic 440. The address in the Control Store where the instruction was fetched from is saved by the Jump History logic 411 in the Local Store Write Register (LSW0) 413 (see FIG. 18B) over Line 412 and subsequently written to the Local Store 414.

Figure 19:
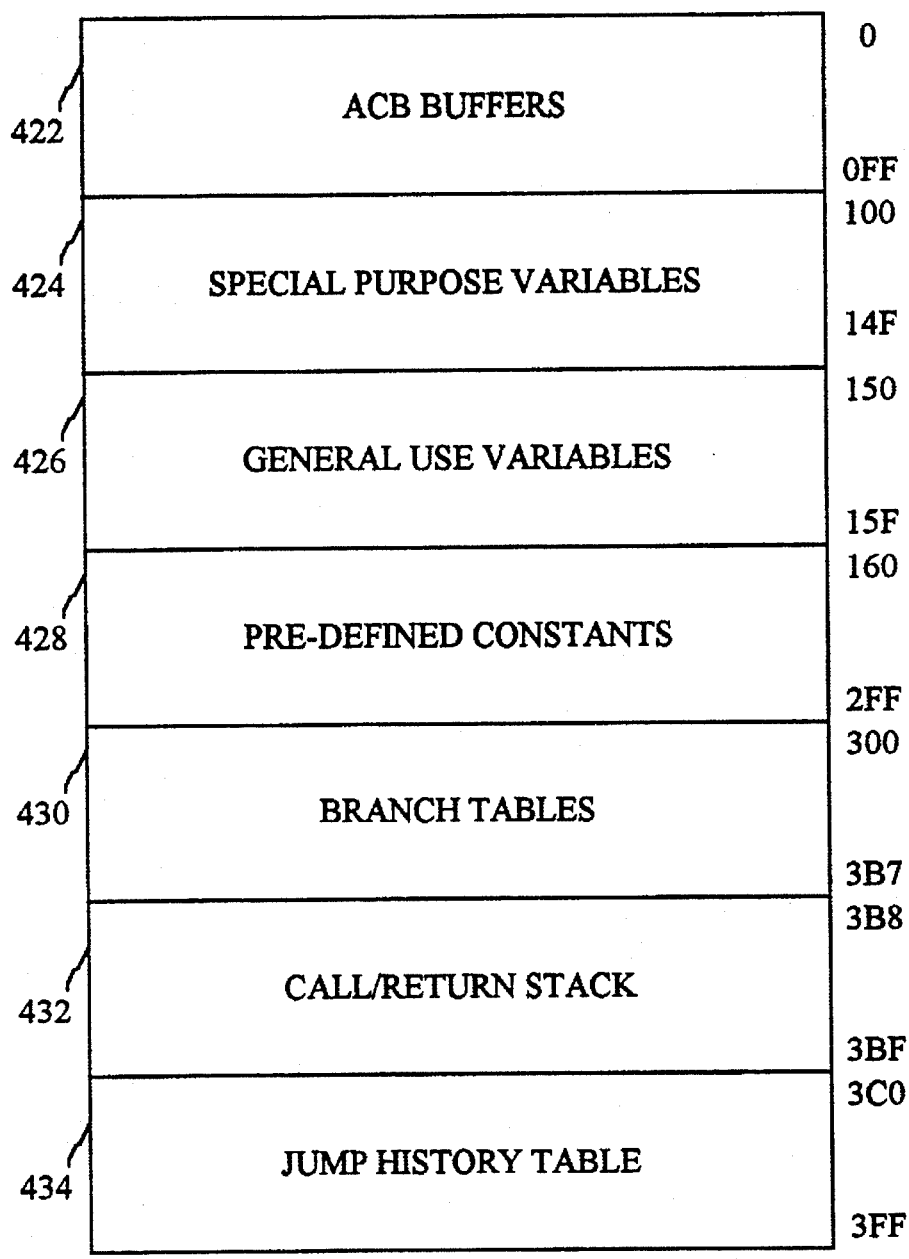
FIG. 19 shows the allocation of the Local Store memory locations.

The Local Store 414 stores data internal to the uSBC for use in executing instructions. The Local Store 414 holds 1024 36-bit words. It is accessed by storing the address to read data from or write data to in one of four special purpose registers. These registers are the Address Read 0 415, Address Read 1 416, Address Write 0 418, and Address Write 1 420. Local store memory locations can be accessed by the Arithmetic Logic Unit (ALU), MOVE, and SHIFT instructions (described below) more quickly than references to the uSBC's general registers. This allows the uSBC to process instructions faster than if no Local Store was available. The Local Store 414 is implemented as a four port RAM cell. The four port RAM cell provides the capability of concurrent access to the memory via two read ports and two write ports. FIG. 19 shows the allocation of the Local Store memory locations. Instructions implemented in the preferred embodiment use the Local Store 414 to hold Activity Control Block (ACB) Buffers 422, Special Purpose Variables 424, General Purpose Variables 426, and Pre-Defined Constants 428. The uSBC hardware logic uses the Local Store 414 to hold Branch Tables 430, the Call/Return Stack 432 and a Jump History Table 434. The Local Store address domains (from 0 to 3 FF overall) of each of these data entries are shown in hexadecimal format in FIG. 19.

Referring back to FIG. 18A, the Saved Program Counter 436 is a register holding the address in the Control Store 224 where the current microcode instruction to be executed is stored. It is loaded with a value selected by MUX 437 from the current Program Counter 409, the current Saved Program Counter 436, or the output of Branch Logic 440 over Line 441. The Saved Program Counter 436 is also stored in the Local Store 414 by Jump History logic 408. The Jump History Table 434 holds the most recent 64 traced changes in program counter control. The contents of the Saved Program Counter 436 are also forwarded to MUX 504 over Line 438.

When the current instruction is a branch instruction, Branch Logic 440 (see FIG. 18C) determines if the branch condition has been satisfied and if it has, then Branch Logic 440 forwards the address of the instruction to be branched to over Line 441 to MUX 439 for subsequent storage in the Program Counter 409. This causes the next instruction fetched to be the instruction stored at the branch address rather than the next sequential instruction. Evaluation of the branch condition includes reading the External Branch Condition signal 443 via External Branch Detection logic 444 if the branch instruction is an External Branch instruction. It includes accepting input from the Internal Branch Detection logic 445 if the branch instruction is an Internal Branch instruction. It also includes accepting input from the Accumulator 442 if the branch instruction is a Table Branch instruction.

The instruction stored in the Instruction Register 410 is processed by two sets of logic. The Command Decode Logic 446 determines what kind of command is indicated by the instruction and forwards data and control information contained in the instruction to the Arithmetic Logic Unit (ALU) 448 over Line 450 and to the Station Activity Control logic 452 (shown on FIG. 18(D)) over Line 454. The Station Decode Logic 456 determines which Station is to be referenced by the instruction, if necessary. The Station identification information obtained by the Station Decode Logic 456 is forwarded over Line 458 to MUX 460. This Station identification information is used to select which Continue signal (1 through 8) 462 (shown on FIG. 18(D)) activation is expected as a result of the execution of the current instruction. The Station Decode Logic 456 also forwards the Station identification information directly to the Station Activity Control logic 452 over Line 464.

The Immediate Move Data register 466 (shown on FIG. 18A) holds the data to be transferred to a uSBC internal register, an external register, or to the Local Store 414. The Immediate Move Data 466 is obtained from the instruction stored in the Instruction Register 410.

The Microsequencer Bus Controller (uSBC) contains various internal registers used during processing of instructions. Operand data for an instruction is read out of the Local Store 414 and stored in general purpose Register A (REGA) 468 (see FIG. 18B). A mask/merge bit pattern for manipulating operand data is read out of the Local Store 414 and stored in the Mask/Merge Register (MMRG) 470. The Bus Receive Register (BUSR) 472 (see FIG. 18A) is a 36-bit register that holds data, received from the Micro Bus over Line 474, resulting from an external read. It is the only uSBC register that can be written by the Micro Bus 218. During the execution of a operation to read a register on a station external to the uSBC, the resulting data is put into the BUSR 472. It can then be moved to the Local Store 414 or used as an operand for an instruction. The Accumulator (ACC) 442 (see FIG. 18C) is a 36-bit register that holds the results of the ALU 448 after execution of an instruction. It is the only register that can output data from the uSBC to the Micro Bus 218. Therefore, every write of an external register or designator uses the ACC 442.

There are six other special purpose registers used by the Microsequencer Bus Controller (uSBC). The Local Store Base Register (LSBR) 476 is a six bit register used for Based addressing of the Local Store 414. If Based addressing is selected, the uSBC uses the contents of LSBR 476 as the six most significant bits of the 10-bit Local Store address, and obtains the four least significant bits from the instruction. Instructions use Based addressing to access the ACB Buffers 422 within the Local Store 414. The Maintenance Data Out Register (MDOR) 478 is used to report fatal and non-fatal errors. It is a 32-bit dynamic scan/set register connected to the Maintenance processing of the File Cache System 18 via the MTCC 244. The Maintenance Data In Register (MDIR) 480 is a 32-bit dynamic scan/set register under the control of the Maintenance processing of the File Cache System 18 via the MTCC 244. The MDIR is used by Maintenance to send messages to the uSBC.

The Flags Register (FLGR) 482 is a hardware flags register. It contains 16 bits which are individually tested, set, and cleared. Any number of these flags can be set/cleared in one instruction. The flags are also used as branch condition indicators. The Source Index Register (SIXR) 484 and the Destination Index Register (DIXR) 486 are 14-bit registers used for indexing external registers and as internal loop counters. The SIXR 484 is used for indexing read requests from Local Store 414, and DIXR 486 is used for indexing write requests to Local Store 414. These registers can be automatically incremented as part of the execution of many instructions. Thus they are useful and efficient loop counters.

The Microsequencer Bus Controller (uSBC) contains two main processing groups of logic. The Shift/Mask/Merge unit performs all shift operations, as well as masking and merging of operands. Shift logic 488 selects the contents of one of the registers described above as input data via MUX 490 and MUX 491 as shown. Control of the shift, such as shift direction and length, is obtained from the Command Decode logic 446. The results of the Shift operation are forwarded to Mask logic 492. The Mask logic 492 also obtains input data representing a mask bit pattern from the MMRG register 470 over Line 494. Results of the Mask logic 492 are forwarded to Merge logic 496. Merge logic 496 also accepts input data representing an address in the Local Store 414 from REGA 468 over Line 498 or from one of the internal registers multiplexed by MUX 489. Merge logic 496 obtains a merge bit pattern from the MMRG register 470 over Line 494. The results of the Shift/Mask/Merge operation are forwarded via Line 502 and MUX 504 to the Accumulator 442.

The ALU 448 performs all arithmetic and logical operations. It processes either 32-bit or 36-bit data words, depending on the whether the uSBC is on a DM 48 or a HIA 52 component in the File Cache System 18. The ALU 448 selects operand data from one of the internal registers and REGA 468 via MUX 489, or MMRG 470 over Line 494. It also obtains command information from the Command Decode Logic 446 via Line 450. The result of the arithmetic or logical operation is stored in the Accumulator 442 (see FIG. 18C) via MUX 504 and Line 508.

The Accumulator 442 selects data to store via MUX 504 from four possible sources. The first source is the Saved Program Counter 436 which forwards data over Line 438. The dam from the Saved Program Counter 436 represents the address of the instruction being executed. The second source is the output from the ALU 448 over Line 508. The third source is MUX 510 which forwards Immediate Move Data from an instruction or data from one of the internal registers over Line 512. The fourth source is the output from the Shift/Mask/Merge logic grouping over Line 502.

The contents of the Accumulator 442 may be selected by MUX 490 as an operand for the execution of a subsequent instruction via Line 514. The contents of the Accumulator 442 are also stored in the Local Store 414 via Line 514. The contents of the Accumulator 442 may also be written to a register on a Station connected to the Micro Bus 218. Bus Control Logic 516 controls transfers over the bi-directional Micro Bus 218.

If the Microsequencer Bus Controller (uSBC) is a slave uSBC, then the contents of the Accumulator 442 are forwarded over Line 230 to the master uSBC for comparison with the result stored in the master uSBC's Accumulator. Checker logic 518 compares the two values and indicates a fatal error to the uSBC Halt logic 520 (see FIG. 18B) if the two values are not equal. The uSBC Halt logic 520 then stops the microprocessor. Processing is also halted if an error indication is received from one of the Stations via a Station Error 522 or Station Abort 524 signal. These signals are processed by Station Error Detection logic 525 and a error indication is forwarded to uSBC Halt logic 520. A Lock Bus signal 324 is then sent out to notify the other Stations that there is a problem. Multiple Continue Error Detection logic 526 detects errors relating to multiple Continue signals being received by the uSBC from MUX 460 over Line 528. If such an error occurs, the uSBC Halt logic 520 stops the microprocessor. Finally, if an internal fault occurs, Internal Fault Capture logic 529 detects the error and notifies the uSBC Halt logic 520.

Data may be received over the Micro Bus 218 in either full-word or half-word modes. In full-word mode, the data consists of either 32 or 36 bits, depending on the mode setting of the uSBC. In half-word mode, the data consists of either 16 or 18 bits, again depending on the mode setting of the uSBC. The data received over the Micro Bus 218 is stored in the Bus Received Register 472 after being selected by MUX 530 depending on the setting of the Half Word signal 532. If the Half Word signal is present, then the lower half of the bits in the data sent to the Bus Received Register 472 is zeroed out.

The Microsequencer Bus Controller (uSBC) informs the Stations that it is transmitting data over the Micro Bus 218 by manipulating the Bus Busy lines 534. Bus Busy Logic 536 accepts as input command information from the Command Decode Logic 446 over Line 454 and Station identification information from the Station Decode Logic 456 over Line 458. The Bus Busy Logic 536 sets the corresponding Bus Busy line to high when the uSBC is transferring data from the Accumulator 442 over the Micro Bus 218 to that particular Station.

High level functional control of the Micro Bus 218 is managed by the Station Activity Control logic 452. Station Activity Control 452 implements the uSBC/Station communication protocol by setting and clearing the eight Source signals 540, the Data Destinate signal 308, four of the eight Branch On External Condition signals 320, the Latch Set signal 312, and the Latch Clear signal 316. Bus Wait Logic 548 ensures that Station Activity Control 452 does not attempt to access the Micro Bus 218 if it is not available for data transfers.

B. uSBC Instruction Set

The instruction set of the Microsequencer Bus Controller (uSBC) contains seven instructions.

1. Move (MOVE) Instruction

Figure 20:
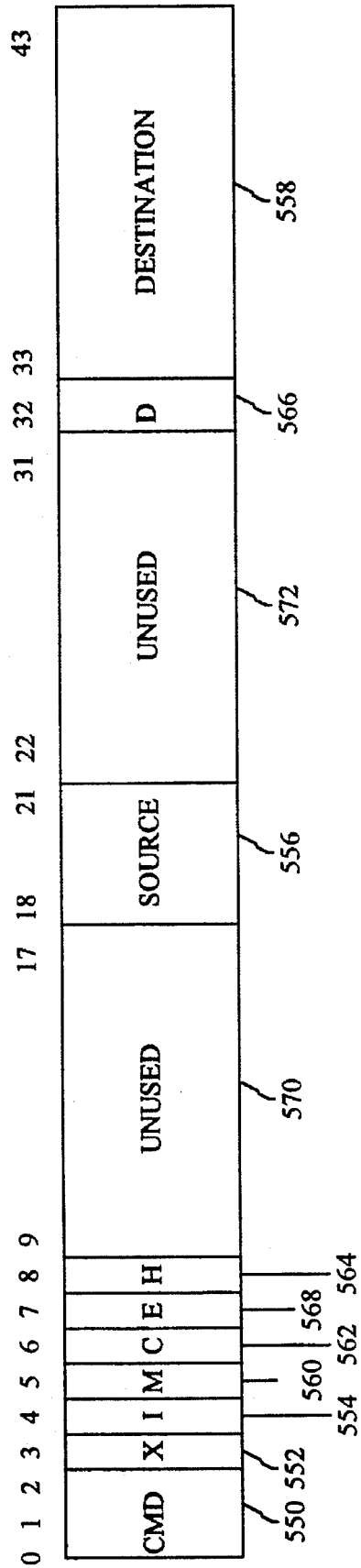
FIG. 20 shows the general format of the Move instruction.

The MOVE instruction is used to move data from a register to a Local Store 414 memory location, from the Control Store 224 to the Local Store 414 or a register, or from the Accumulator 442 to a register in any Station connected to the Micro Bus 218. FIG. 20 shows the general format of the Move instruction. The CMD field (bits 0–2) 550, when equal to zero, specifies that this is a MOVE instruction. The X field (bit 3) 552, when set, indicates that the indexed addressing mode is selected. The I field (bit 4) 554, when set, causes the SIXR 484 to be incremented by one after all data references for this instruction are complete. The Source field (bits 18–21) 556 indicates the register source of the data. The possible registers are LSBR 476, MDOR 478, MDIR 480, ACC 442, FLGR 482, BUSR 472, SIXR 484, and DIXR 486. The Destination field (bits 33–45) 558 specifies the destination of the data. The M field (bit 5) 560, when set, indicates a MOVE instruction is to be executed. If the M field is clear, then a NOP instruction is performed.

The C field (bit 6) 562, when set, indicates an immediate operand is to be moved from bits 14–31 of the instruction into the Local Store 414 address specified by the Destination field (bits 33–43) 558. If the H field (bit 8) 564 is set, then the immediate operand is loaded into bits 0–17 of the Local Store 414 memory location. If the H field 564 is clear, then the immediate operand is loaded into bits 18–35 of the Local Store 414 memory location. If the uSBC is operating in 32-bit mode, the data will be written into bits 4–17, or bits 18–35, depending on the H field 564 setting, of the Local Store 412 memory location. When the C field 562 is set and bit 33 is set, bits 41–43 of the instruction indicate the register destination of the immediate operand. The register destination may be LSBR 476, MDOR 478, MDIR 480, ACC 442, SIXR 484, or DIXR 486. The D field (bit 32) 566 indicates if Local Store based addressing is to be used to obtain the destination address for the MOVE instruction.

The E field (bit 7) 568, when clear, indicates a move to Local Store from one of the internal registers (LSBR 476, MDOR 478, MDIR 480, ACC 442, FLGR 482, BUSR 472, SIXR 484, or DIXR 486). The E field 568, when set, indicates an external move, that is, a move of data from the Control Store 224 or to a register on a Station. Bits 9–17 570 and 22–31 572 are unused.

2. External Source (XSRC) Instruction

Figure 21:
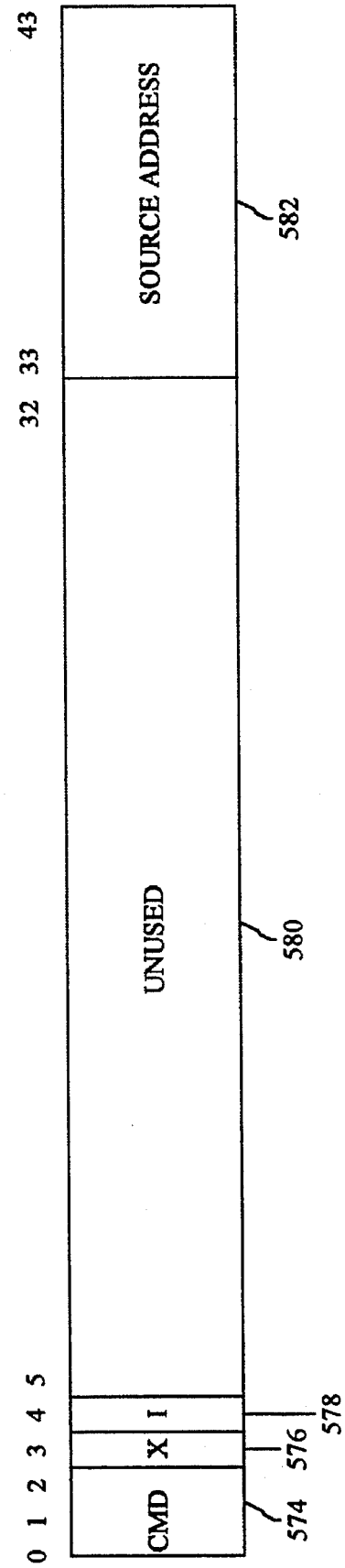
FIG. 21 shows the format of the External Source instruction.

The External Source instruction is used to obtain data from registers which are resident on a Station. FIG. 21 shows the format of the External Source instruction. The CMD field (bits 0–2) 574, when equal to four, specifies that this is an XSRC instruction. The X field (bit 3) 576, when set, indicates that the indexed addressing mode is selected. The I field (bit 4) 578, when set, causes the SIXR 484 to be incremented by one after all data references for this instruction are complete. Bits 5–32 580 are unused. The Source Address field (bits 33–43) 582 specifies the address of the external register where data is to be read from. The format of the Source Address is as shown in FIG. 12. The data fetched by this instruction is stored in BUSR 472.

3. Set/Clear (STCL) Instruction

Figure 22:
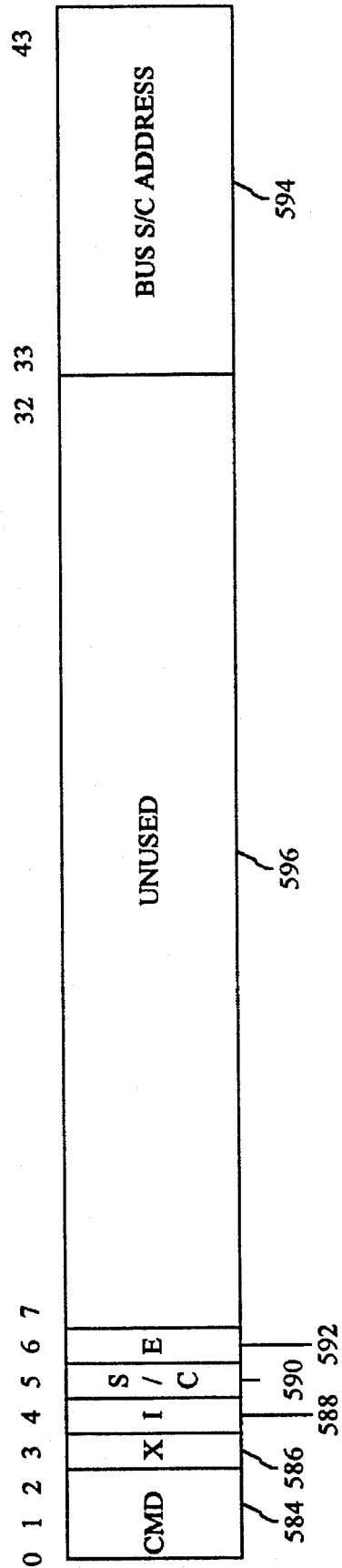
FIG. 22 shows the format of the Set/Clear instruction.
Figure 23:
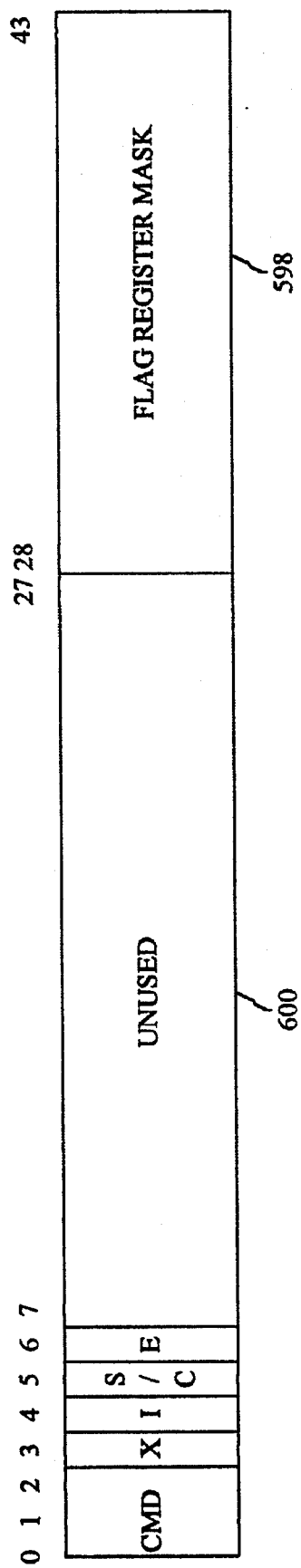
FIG. 23 shows the format of the Set/Clear instruction for the manipulation of an internal flag.

The Set/Clear (STCL) instruction sets or clears designators, either internal to the uSBC or resident on a Station. FIG. 22 shows the format of the Set/Clear instruction. The CMD field (bits 0–2) 584, when equal to two, specifies that this is a STCL instruction. The X field (bit 3) 586, when set, indicates that the indexed addressing mode is selected. The I field (bit 4) 588, when set, causes the SIXR 484 to be incremented by one after all data references for this instruction are complete. The S/C field (bit 5) 590 indicates a set operation (when the S/C field is a one) or a clear operation (when the S/C field is a zero) is to be performed on the designator. If the E field (bit 6) 592 is set, the designator to be referenced is located on a Station. Then bits 33–43 contain the Bus S/C Address 594, which is the address of the designator to be set or cleared, and bits 7–32 596 are unused. FIG. 23 shows the format of the Set/Clear instruction for the manipulation of an internal flag. If the E field 592 is clear, then the bits to be set or cleared are defined by the Flag Register Mask field (bits 28–43) 598, and bits 7–27 600 are unused. The Flag Register Mask field 598 indicates, in a master bit manner, which of the 16 flags in FLGR 482 are to be set or cleared.

4. Branch (BRCH) Instruction

Figure 24:
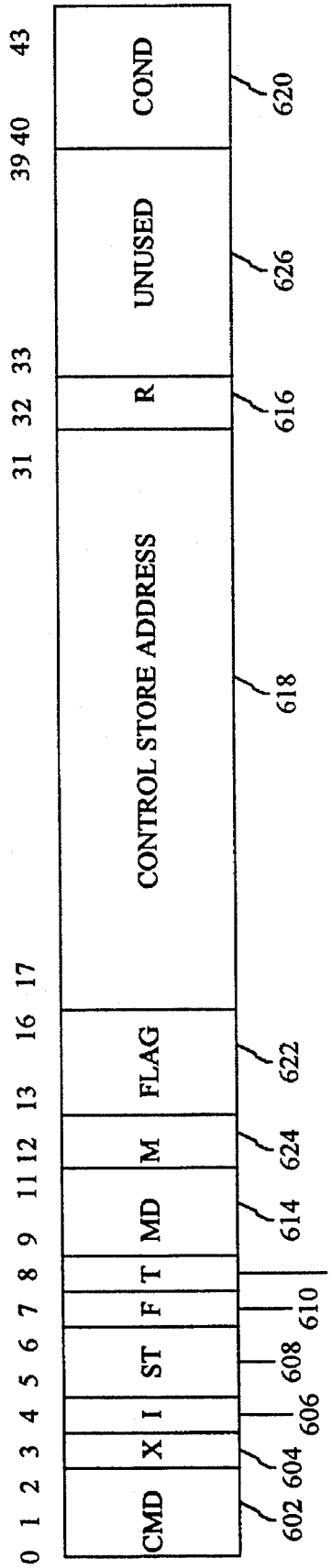
FIG. 24 shows the format of an Internal Branch instruction.

The Branch (BRCH) instruction is used to change the execution sequence of instructions in an instruction stream. FIG. 24 shows the format of an Internal Branch instruction. The CMD field (bits 0–2) 602, when equal to six, specifies that this is a BRCH instruction. The X field (bit 3) 604, when set, indicates that the indexed addressing mode is selected. The I field (bit 4) 606, when set, causes the SIXR 484 to be incremented by one after all data references for this instruction are complete. The ST field (bits 5–6) 608 controls the Call/Return Stack 432 during a BRCH instruction. If the ST field 608 is one and the branch condition is evaluated as true, then processing of this instruction includes popping an address off the Call/Return Stack 432. If the ST field 608 is two and the branch condition is evaluated as true, then processing of this instruction includes resetting the Call/Return Stack 432. If the ST field 608 is three then no entry is to be made in the Jump History Table 434.

The F field (bit 7) 610 indicates whether the branch will take place on a true value (F=0) or a false value (F=1). The T field (bit 8) 612, when set, indicates that a Table Branch instruction is to be executed. The MD field (bits 9–11) 614 specifies the mode of operation for the branch instruction. The R field (bit 32) 616 selects either BUSR 472 (when R=0) or ACC 442 (when R=1) as an input register for this instruction. If the T field 612 is clear, then the instruction is either an Internal Branch or an External Branch. The MD field 614 specifies whether the branch is internal (when MD=0) or external (when MD=4). When the branch is internal or external, the Control Store Address field (bits 17–31) 618 specifies an address in the Control Store 224 where the next microcode instruction is to be fetched from, if the branch condition is satisfied.

If the branch is internal, the COND field (bits 40–43) 620 indicates the condition upon which the branch will take place. When the MD field 614 is zero, one, or two, and the COND field 620 is nine (which indicates a branch conditioned by the setting of the FLGR 482 bits), the FLAG field (bits 13–16) 622 indicates which designator in FLGR 482 must be set for the branch condition to be true. The M field (bit 12) 624 indicates a modified branch instruction. When M is set, program control is always transferred to the next sequential microcode instruction. However, the condition indicated by the BRCH instruction is stored in the FLGR 482 bits selected by the FLAG field 622, although the branch is not to be taken. Bits 33–39 626 are unused.

Figure 25:
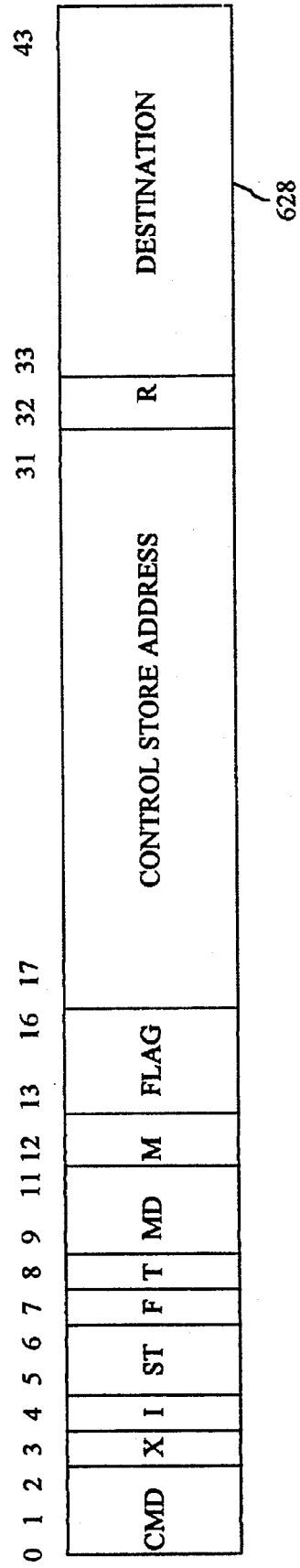
FIG. 25 shows the format of an External Branch instruction.

FIG. 25 shows the format of the External Branch instruction. If the branch is external, the Destination field (bits 33–43) 628 specifies a register resident on a Station which holds the value to be evaluated for the branch condition. The External Branch instruction is different from ordinary branch instructions in that it uses a status external to the uSBC (a designator on a Station) to determine whether the branch should be taken. The uSBC accesses this external status flag to obtain and evaluate the branch condition in parallel with other steps being performed for the branch instruction, rather than fetching the value over the Micro Bus 218 and then evaluating it. The uSBC initiates an external test of the designator resident on the Station specified by the Destination field 628 of the External Branch instruction. While this request is being performed, the uSBC gets the address of the next instruction in Control Store 224 memory and stores it, assuming that the branch may not be taken. The uSBC also reads the branch address specified by the Control Store Address 618 field of the External Branch instruction. When the condition of the designator arrives over the External Branch signal 443, the Branch Logic 440 uses either the next address or the branch address, depending on the value of the condition specified by the designator, to transfer control for execution of the next instruction. Because the designator test and address fetching are done in parallel, the execution time for this instruction is minimized.

Figure 26:
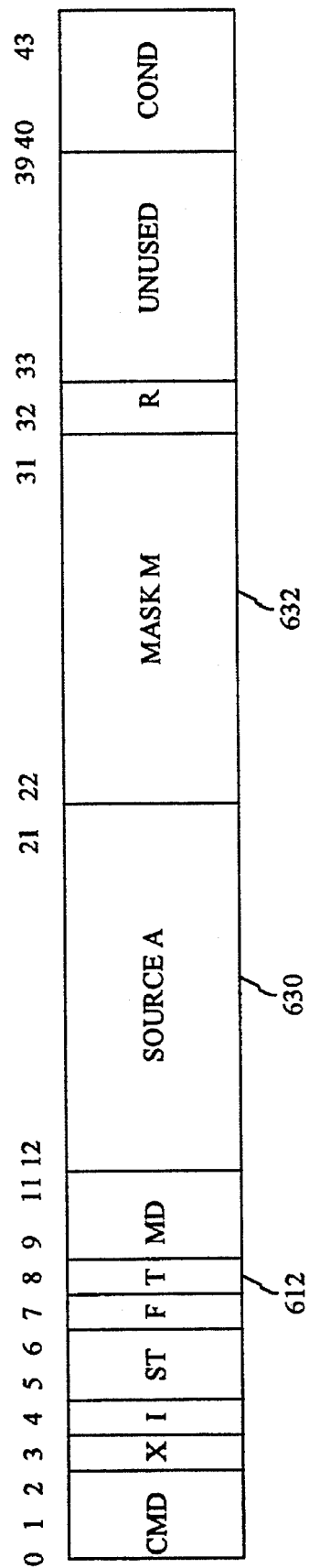
FIG. 26 shows the format of a Table Branch instruction.

FIG. 26 shows the format of the Table Branch instruction. If the branch is a Table Branch (when the T field 612 is set), the Source A field (bits 12–21) 630 indicates an address in the Local Store 414 from which a base value of a Branch Table will be fetched and merged with the data stored in either BUSR 472 or ACC 442. The Merge logic 496 uses the Mask/Merge control word stored at the Local Store address specified by the Mask M field (bits 22–31) 632. The result of this computation is the address in the Local Store 414 which contains the address in the Control Store 224 where control is to be branched, if the branch condition is satisfied.

Figure 27:
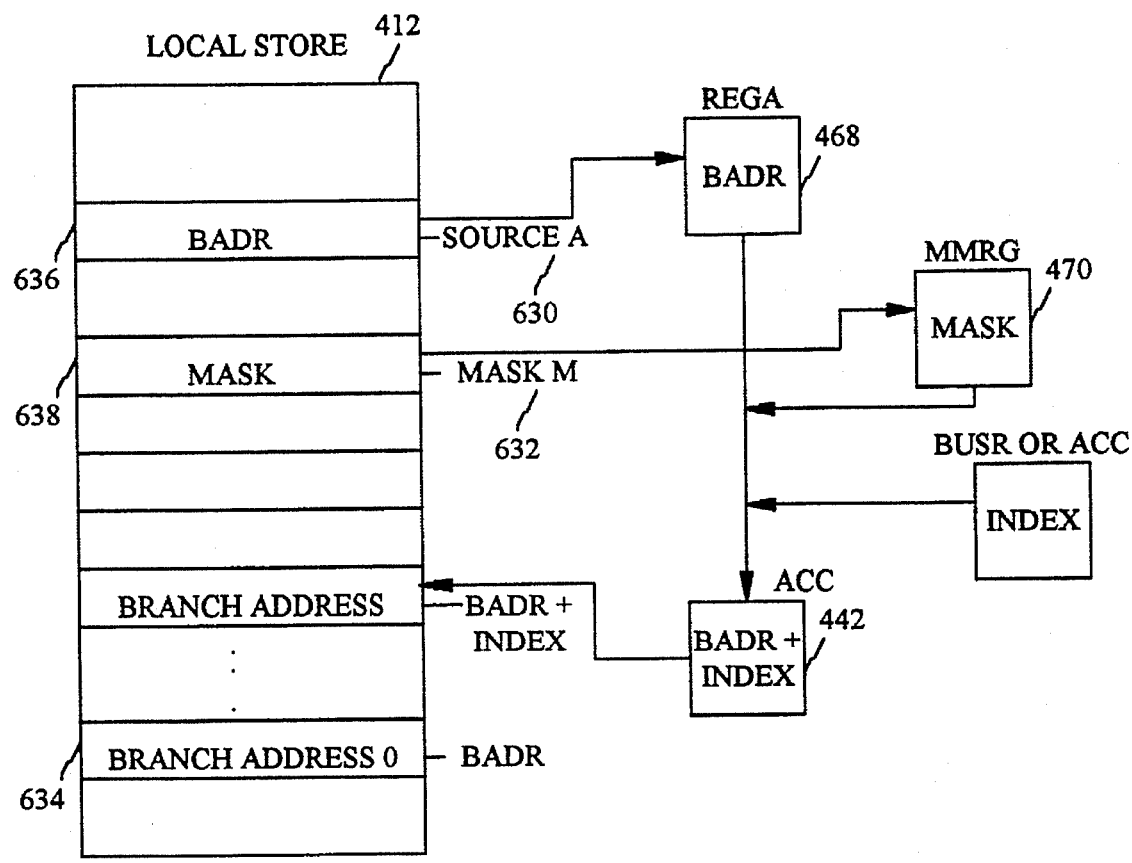
FIG. 27 is a block diagram illustrating the relationships between the Local Store and internal registers in executing the Table Branch instruction.
Figure 28:
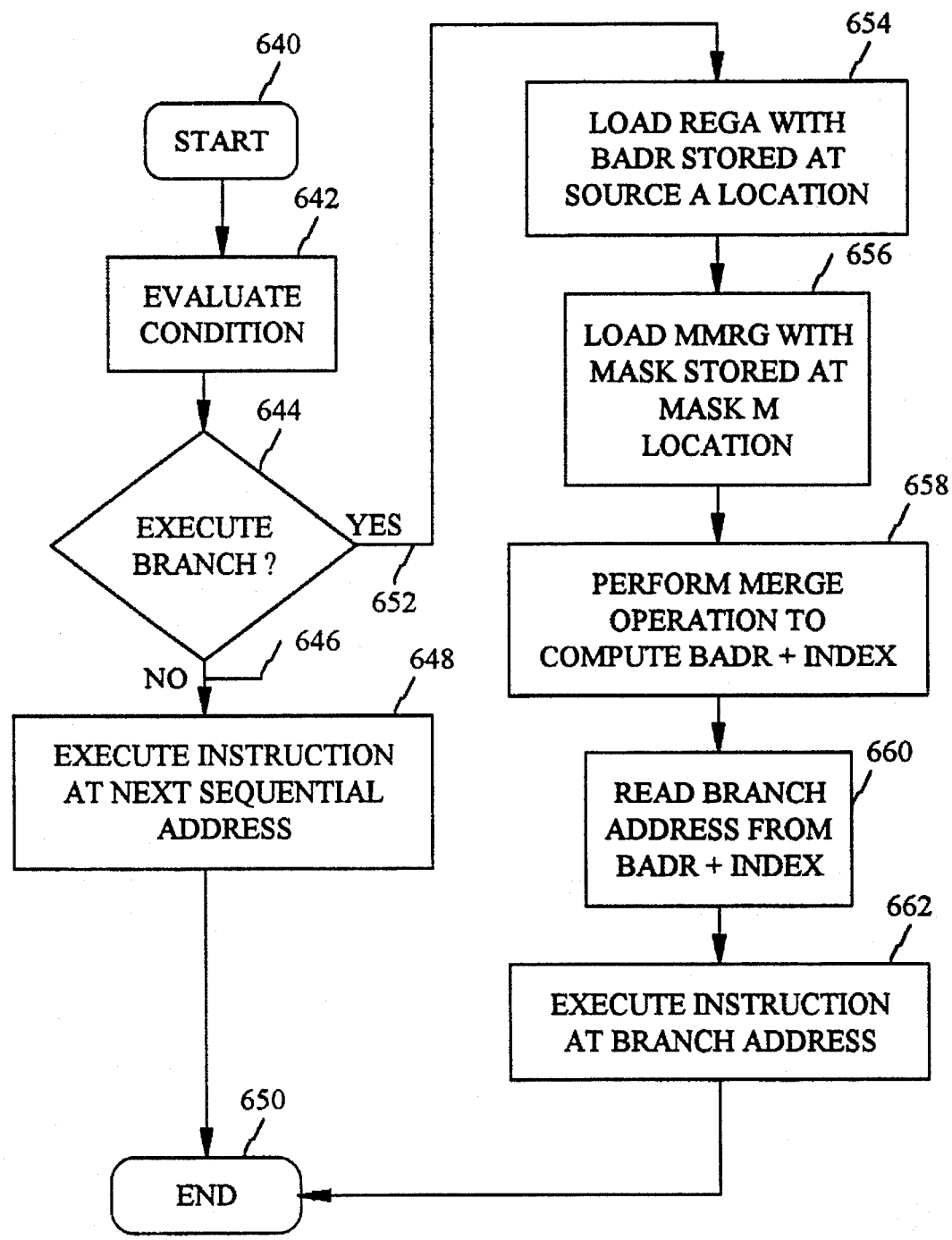
FIG. 28 is a flow chart describing the steps performed during the execution of the Table Branch instruction.

FIG. 27 is a block diagram illustrating the relationships between the Local Store and internal registers in executing the Table Branch instruction. The Local Store 414 contains Branch Tables 430 which hold addresses of microcode instructions in the Control Store 224. The addresses are storm in the Local Store 414 starting at a Base Address (BADR) 634. The contents of the memory location at BADR 634 is Branch Address 0. The value BADR is stored at system initialization time in the Local Store 414 at a memory location 636 subsequently pointed to by the Source A field 630 of the Table Branch instruction. Similarly, the value of the Mask was stored at the memory location 638 pointed to by the Mask M field 632 of the Table Branch instruction. FIG. 28 is a flow chart describing the steps performed during the execution of the Table Branch instruction. From the Start Step 640, the uSBC evaluates the condition 642 of the branch. If the branch is not to be taken at Step 644, then the No path 646 is taken and the uSBC executes the instruction at the next sequential address 648 in the Control Store 224, and ends performance of the Table Branch instruction at End Step 650.

If the branch is to be taken at Step 644, the Yes path 652 is taken and the uSBC performs Step 654 by loading REGA 468 with the Base Address (BADR) stored at the Source A 630 location 636. Next, Step 656 is performed to load MMRG 470 with the Mask stored at the Mask M 632 location 638. A merge operation is then performed at Step 658 to merge BADR and Index according to the Mask value, where Index is a value obtained from either BUSR 472 or ACC 442. Register BUSR 472 or ACC 442 is loaded with the Index value at the completion of the instruction immediately preceding the Table Branch instruction. The resulting value of the merge operation is an address in the Branch Table 430 stored in Local Store 414. This Branch Address is read out of the Branch Table location specified by BADR+Index at Step 660. Program control is transferred to this address by executing the instruction stored at the Branch Address at Step 662 and Table Branch instruction processing ends at Step 650.

5. Arithmetic Logic and Shift (ALUI) Instruction

Figure 29:
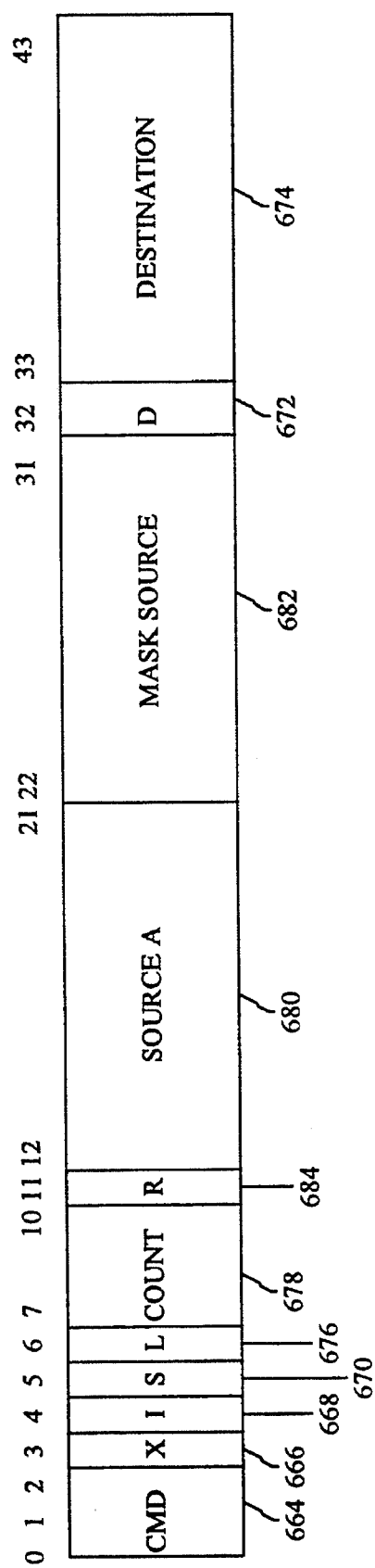
FIG. 29 shows the format of the Arithmetic Logic and Shift instruction.

The Arithmetic Logic and Shift instruction is used to execute all arithmetic, logical, and shift operations that store results in the Local Store 414. FIG. 29 shows the format of the Arithmetic Logic and Shift instruction. The CMD field (bits 0–2) 664, when equal to five, specifies that this is an ALUI instruction. The X field (bit 3) 666, when set, indicates that the indexed addressing mode is selected. The I field (bit 4) 668, when set, causes the SIXR 484 to be incremented by one after all data references for this instruction are complete. The S field (bit 5) 670, when set, indicates that the operation to be performed is a shift. When the S field is clear, an arithmetic or logical operation is to be performed. The D field (bit 32) 672, when set, indicates that the upper six bits of the Local Store address for the Destination field (bits 33–43) 674 are to be obtained from LSBR 476. Thus, based addressing is supported.

When a shift operation is requested (S=1), the L field (bit 6) 676 indicates whether the shift is a left shift (when L=1) or a right shift (when L=0). The Count field (bits 7–10) 678 specifies the number of bits to be shifted. The Source A field (bits 12–21) 680 indicates the address in the Local Store 414 where Operand A for this operation is to be fetched. Operand A is loaded into REGA 468 as part of the processing of this instruction. Operand B was loaded into BUSR 472 from the Micro Bus 218 during the execution of the previous instruction. The Mask Source field (bits 22–31) 682 indicates the address in the Local Store where the Mask and Merge operand is to be fetched. The Mask and Merge operand is stored in MMRG 470.

FIG. 30 shows the format of the Mask and Merge operand for a 36-bit data word. The even numbered bits (denoted by 'M') represent the Mask values and the odd bits (denoted by 'R') represent the Merge values. These bits control the masking and merging of the data. The Mask/Merge bits operate on bit pairs of an operand. Thus, a Mask/Merge bit pair (bits 0–1, 2–3, 4–5, etc.) control corresponding bit pairs of the operand. If a Mask bit is set, then the corresponding bit pair of the operand is carried forward to the result register ACC 442. If a Mask bit is clear, then the corresponding bit pair of the operand is not carried forward to the result register ACC 442; instead, the specified bit pair in the result register ACC 442 is cleared. If a Merge bit is set, the corresponding bit pair of the second operand, which is stored in BUSR 472, is copied to the result register ACC 442. If a Merge bit is clear, the corresponding bit pair of the first operand, which is stored in REGA 468, is copied to the result register ACC 442.

FIG. 31 shows the format of the Mask and merge operand for a 32-bit data word. Bits 0–3 686 of the operand are ignored.

Referring back to FIG. 29, when the R field (bit 11) 684 is set, a shift and mask are executed on the BUSR operand 472, and then a merge of BUSR 472 and Operand A is executed, according to the Mask and Merge operand. When the R field 684 is clear, a shift and mask are executed on Operand A, and then a merge of Operand A and BUSR 472 is executed, according to the Mask and Merge operand. The result is stored at the address in the Local Store 414 memory location designated by the Destination field (bits 33–43) 674.

Figure 32:
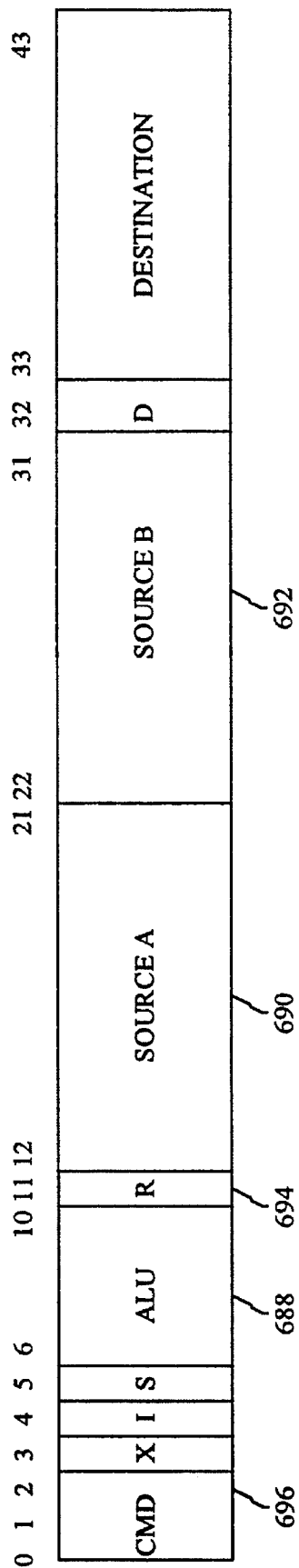
FIG. 32 shows the format of the Arithmetic Logic instruction.

When the S field is clear, an arithmetic or logical operation is to be performed. FIG. 32 shows the format of the Arithmetic Logic instruction. Bits 6–10 are now interpreted as an ALU field 688. The ALU field indicates the type of ALU operation to be executed. FIG. 33 is a list of the arithmetic and logical operations supported by the Arithmetic Logic instruction. Referring back to FIG. 32, the Source B field (bits 22–31) 690 indicates the Local Store 414 address containing Operand B. The Destination field (bits 33–43) 692 indicates the Local Store 414 address where the result of the operation is to be stored when bit 33 is zero. If bit 33 is one, then bits 41–43 indicate which register where the result is to be stored. The R field (bit 11) 694, when set, indicates that Operand B is fetched from the Local Store 414, but Operand A is read from a register identified by bits 19–21. When the R field is clear, both operands are fetched from the Local Store. The register identifiers are listed below.

```
LSBR = 0   MDOR = 1           MDIR = 2   ACC = 3
FLGR = 4 (source only)  BUSR = 5 (source only)
SIXR = 6   DIXR = 7
```

6. Arithmetic Logic and Shift External (ALUX) Instruction

The Arithmetic Logic and Shift External instruction provides the same functionality as the ALUI instruction, except that the Destination field (bits 33–43) 692 indicates an address that is external to the uSBC (i.e., designating a register on a Station). The format of the address is as shown in FIG. 12. For this instruction the CMD field 696 is set to three.

7. Arithmetic Logic and Shift Register (ALUR) Instruction

The Arithmetic Logic and Shift Register instruction is similar to the ALUI and ALUX instructions except that it only provides the capability to execute a shift, mask, and merge on one operand, instead of two operands. Referring back to FIG. 29, when the R field 684 is clear, it indicates that the Source A field 680 is the address in Local Store 414 where Operand A is to be fetched. The Mask Source field 682 indicates the address in Local Store where the mask and merge operand is to be fetched. When the R field 684 is set, the operand is a register selected by bits 19–21 according to the identifiers listed in the table above. The D field (bit 32) 672 now indicates whether the Destination field address is an external address or a Local Store address. When the D field 672 is clear, the Destination field 674 indicates a Local Store address where the result of the operation is to be stored if bit 33 is clear, else bits 41–43 indicate a register as the destination of the operation result.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. In a computer system having a plurality of different classes of digital data processing subsystems arranged for performing differing functions, one of the digital data processing subsystems being a microsequencer bus controller subsystem, the microsequencer bus controller subsystem comprising:

a control store including addressable memory wherein predetermined instructions are stored;

first and second microprocessors coupled to said control store, said first and second microprocessors functioning to simultaneously execute in parallel said predetermined instructions fetched from said control store, said first microprocessor producing a first result from executing each of said predetermined instructions and said second microprocessor producing a second result from executing each of predetermined instructions, error detection circuitry to compare said first result of said first microprocessor's execution of each of said predetermined instructions with said second result of said second microprocessor's execution of each of said predetermined instructions to detect an error occurring during the execution of each of said predetermined instructions by either said first microprocessor or said second microprocessor;

a bi-directional bus connected to said first and second microprocessors, said bi-directional bus transferring data signals in either a first selected size of data words or a second selected size of data words, said first selected size of data words modulo said second selected size of data words being non-zero; and a plurality of independent processing units connected to said bi-directional bus and to the plurality of digital data processing subsystems, each of said plurality of independent processing units selectively performing predetermined functions including transferring data between said independent processing units and transferring data between said independent processing units and the plurality of digital data processing subsystems, wherein a first predetermined number of said independent processing units is controlled by said first microprocessor and a second predetermined number of said independent processing units is controlled by said second microprocessor.

2. The microsequencer bus controller subsystem of claim 1, wherein said first and second microprocessors include circuitry for processing either said first selected size or said second selected size of data words.

3. The microsequencer bus controller subsystem of claim 2, wherein said first selected size is 36 bits per data word, and said second selected size is 32 bits per data word.

4. The microsequencer bus controller subsystem of claim 1, wherein the number of said independent processing units is up to eight.

5. The microsequencer bus controller subsystem of claim 1, wherein said first predetermined number of independent processing units controlled by said first microprocessor and said second predetermined number of independent processing units controlled by said second microprocessor are the same.

6. The microsequencer bus controller subsystem of claim 1, wherein said first and second microprocessors are reduced instruction set computing (RISC) machines.

7. The microsequencer bus controller subsystem of claim 6, wherein said predetermined instructions selectively includes Move, External Source, Set/Clear, Branch, Arithmetic Logic and Shift, Arithmetic Logic and Shift External, and Arithmetic Logic and Shift Register instructions.

8. The microsequencer bus controller subsystem of claim 6, wherein all of said predetermined instructions have identical fixed lengths.

9. The microsequencer bus controller subsystem of claim 1, wherein said control store comprises a plurality of static random access memory modules.

10. The microsequencer bus controller subsystem of claim 1, further comprising maintenance and clock control circuitry coupled to said first and second microprocessors, said bi-directional bus, and said plurality of independent processing units to control subsystem initialization, subsystem reset/recovery, clock distribution and control, fault detection, maintenance, and synchronization functions.

11. In a computer system having a plurality of different classes of digital data processing subsystems, one of the digital data processing subsystems being a microsequencer bus controller subsystem, the microsequencer bus controller subsystem comprising:

storage means for storing predetermined instructions;

first and second programmable digital data processing means coupled to said storage means, said first and second programmable digital data processing means for simultaneously executing in parallel said predetermined instructions fetched from said storage means, said first programmable digital data processing means producing a first result from executing each of said predetermined instructions and said second programmable digital data processing means producing a second result from executing each of said predetermined instructions, said first programmable digital data processing means including means for comparing said first result of its execution of each of said predetermined instructions with said second result of said second programmable digital data processing means execution of each of said predetermined instructions to detect an error occurring during the execution of each of said predetermined instructions by either said first programmable digital data processing means or said second programmable digital data processing means;

dual-size bi-directional bus means connected to said first and second programmable digital data processing means for facilitating transfer of data and control signals, said dual-size bi-directional bus means transferring data signals in either a first selected size or a second selected size of data words, said first selected size of data words modulo said second selected size of data words being non-zero; and a plurality of independent processing means connected to said dual-size bi-directional bus means and to the plurality of digital data processing subsystems, each of said independent processing means selectively performing predetermined functions including transferring data between said independent processing means and transferring data between said independent processing means and the plurality of digital data processing subsystems, wherein a first predetermined number of said independent processing means is controlled by said first programmable digital data processing means and a second predetermined number of said independent processing means is controlled by said second programmable digital data processing means.

12. The microsequencer bus controller subsystem of claim 11, wherein each of said first and second programmable digital data processing means further include means for processing either said first selected size or said second selected size of data words.

13. The microsequencer bus controller subsystem of claim 12, wherein said first selected size is 36 bits per data word, and said second selected size is 32 bits per data word.

14. The microsequencer bus controller subsystem of claim 11, wherein the number of said plurality of independent processing stations is up to eight.

15. The microsequencer bus controller subsystem of claim 11, wherein said first predetermined number of independent processing means controlled by said first programmable digital data processing means and said second predetermined number of independent processing means controlled by said second programmable digital data processing means are the same.

16. The microsequencer bus controller subsystem of claim 11, wherein said storage means comprises a plurality of memory means for storing data.

17. The microsequencer bus controller subsystem claim 11, wherein said first and second programmable digital data processing means include means for directly accessing storage locations resident in said independent processing means.

18. In a file cache system having a plurality of different classes of digital data processing subsystems interconnected and arranged to perform differing functions, one of the digital data processing subsystems being a microsequencer bus controller subsystem, the microsequencer bus controller subsystem comprising:

a control store including a plurality of static random access memories wherein predetermined fixed-length instructions are stored:

first and second reduced instruction set microprocessors coupled to said control store, said first and second reduced instruction set microprocessors functioning to simultaneously execute in parallel said predetermined fixed-length instructions fetched from said control store, said first reduced instruction set microprocessor producing a first result from executing each of said predetermined fixed-length instructions and said second reduced instruction set microprocessor producing a second result from executing each of said predetermined fixed-length instructions, said first reduced instruction set microprocessor including circuitry to compare said first result of its execution of each of said predetermined fixed-length instructions with said second result of said second reduced instruction set microprocessor's execution of each of said predetermined fixed-length instructions to detect an error occurring during execution of each of said predetermined fixed-length instructions by either said first reduced instruction set microprocessor or said second reduced instruction set microprocessor:

a dual-size bi-directional bus connected to said first and second reduced instruction set microprocessors comprising data, address and control signals, said dual-size bi-directional bus transferring data signals in either a first selected size or a second selected size of data words, said first selected size of data word modulo said second selected size of data word being non-zero; and a plurality of independent processing stations connected to said dual-size bi-directional bus and to the plurality of digital data processing subsystems within said file cache system, each of said plurality of independent processing stations selectively performing predetermined functions including transferring data between said independent processing stations and transferring data between said independent processing stations and the plurality of digital data processing subsystems, wherein a first predetermined number of said independent processing stations is controlled by said first reduced instruction set microprocessor and a second predetermined number of said independent processing stations is controlled by said second reduced instruction set microprocessor.

19. The microsequencer bus controller subsystem of claim 18, wherein said first and second reduced instruction set microprocessors include circuitry for processing either said first selected size or said second selected size of data words.

20. The microsequencer bus controller subsystem of claim 19, wherein said first selected size is 36 bits per data word, and said second selected size is 32 bits per data word.

21. The microsequencer bus controller subsystem of claim 18, wherein the number of said plurality of independent processing stations is up to eight.

22. The microsequencer bus controller subsystem of claim 18, wherein said first predetermined number of independent processing stations controlled by said first microprocessor and said second predetermined number of independent processing stations controlled by said second microprocessor are the same.

23. The microsequencer bus controller subsystem of claim 18, wherein each of said first and second reduced instruction set microprocessors comprise:

instruction decode circuitry to determine a requested command, one or more operands, and a selected independent processing station specified by said predetermined fixed-length instructions;

a plurality of internal registers for storing operands for said requested command and results from said requested command:

local store memory;

arithmetic, logical, and shift circuitry to execute said requested command on said operands;

station activity control circuitry to communicate with said stations to read said operands from said independent processing stations and write said results to said independent processing stations;

branch control circuitry to determine valid conditions for branching instruction execution control of said predetermined fixed-length instructions; and error detection circuitry to detect errors occurring on said independent processing stations and errors internal to said first and second reduced instruction set microprocessors and to halt said first and second reduced instruction set microprocessors if one or more of said errors is detected.

24. The microsequencer bus controller subsystem of claim 18, further comprising maintenance and clock control circuitry coupled to said first and second reduced instruction set microprocessors, said dual-size bi-directional bus, and said independent processing stations to control subsystem initialization, subsystem reset/recovery, clock distribution and control, fault detection, maintenance, and synchronization functions.

25. The microsequencer bus controller subsystem of claim 18, wherein said independent processing stations are custom designed very large scale integrated circuit gate arrays.

26. The microsequencer bus controller subsystem of claim 18, wherein said control store is written with said predetermined fixed-length instructions during microsequencer bus controller subsystem initialization.

27. The microsequencer bus controller subsystem of claim 18, wherein said first reduced instruction set microprocessor reads data signals, address signals, and control signals from said dual-size bi-directional bus and writes data signals, address signals, and control signals to said dual-size bi-directional bus, and said second reduced instruction set microprocessor reads data signals, address signals, and control signals from said dual-size bi-directional bus and writes address signals and control signals to said dual-size bi-directional bus.

28. The microsequencer bus controller subsystem of claim 18, wherein said control signals of said dual-size bi-directional bus from said first and second reduced instruction set microprocessors to said plurality of independent processing stations include a plurality of source signals indicating that reads of selected storage locations on selected ones of said independent processing stations are requested, a plurality of bus busy signals indicating that said dual-size bi-directional bus is in use, a plurality of data destination signals indicating that writes of said selected storage locations on said selected ones of said independent processing stations are requested, a plurality of latch set signals indicating that a setting of single bit storage locations on said selected ones of said independent processing stations are requested, a plurality of latch clear signals indicating that clearing of said single bit storage locations on said selected ones of said independent processing stations are requested, a plurality of branch condition signals indicating that tests of said single bit storage locations on said selected ones of said independent processing stations are requested, and a plurality of lock bus signals indicating that prevention of any of said independent processing stations from accessing said dual-size bi-directional bus is requested.

29. The microsequencer bus controller subsystem of claim 18 wherein said control signals of said dual-size bi-directional bus from said plurality of independent processing stations to said first and second reduced instruction set microprocessors include a plurality of continue signals indicating that selected ones of said independent processing stations has acknowledged previous requests from either said first or said second reduced instruction set microprocessor, a plurality of external branch condition signals indicating the logic level of selected single bit storage locations on said selected ones of said independent processing stations, a plurality of abort signals indicating that hardware failures have occurred on said selected ones of said independent processing stations, and a plurality of error signals indicating that errors relating to said dual-size bi-directional bus have occurred on said selected ones of said independent processing stations.

30. The microsequencer bus controller subsystem of claim 18 wherein said predetermined fixed-length instructions selectively includes Move, External Source, Set/Clear, Branch, Arithmetic Logic and Shift, Arithmetic Logic and Shift External, and Arithmetic Logic and Shift Register instructions.

31. The microsequencer bus controller subsystem of claim 18 wherein said each of said predetermined fixed length instructions includes 44 bits of instruction, eight bits of parity for said instruction, and two bits of address parity.

32. In a file caching computer system having a plurality of digital data processing subsystem, one of the digital data processing subsystems being a microsequencer bus controller subsystem, the microsequencer bus controller subsystem comprising:

a control store including a plurality of static random access memories wherein predetermined fixed-length instructions are stored during microsequencer bus controller subsystem initialization;

first and second reduced instruction set microprocessors coupled to said control store, said first and second reduced instruction set microprocessors functioning to simultaneously execute in parallel selected ones of said predetermined fixed-length instructions fetched from said control store, said first reduced instruction set microprocessor producing a first result from executing said selected predetermined fixed-length instructions and said second reduced instruction set microprocessor producing a second result from executing said selected predetermined fixed-length instructions, said first reduced instruction set microprocessor including circuitry to compare said first result of its execution said selected predetermined fixed-length instructions with said second result of said second reduced instruction set microprocessor's execution of said selected predetermined fixed-length instructions to detect an error occurring during execution of said selected predetermined fixed-length instructions by either said first reduced instruction set microprocessor or said second reduced instruction set microprocessor; said first and said second reduced instruction set microprocessors including circuitry for processing either a first selected size or a second selected size of data words, said first selected size modulo said second selected size being non-zero, each of said first and said second reduced instruction set microprocessor including instruction decode circuitry to determine a requested command, one or more operands specified by said selected predetermined fixed-length instructions;

a plurality of internal registers for storing operands for said requested command and results from said requested command;

local store memory;

arithmetic, logical, and shift circuitry to execute said requested command on said operands;

branch control circuitry to determine valid conditions for branching instruction execution control of said selected predetermined fixed-length instructions; and error detection circuitry to detect errors internal to said first and second reduced instruction set microprocessors and to halt said first and second reduced instruction set microprocessors if at least one of said errors is detected;

a dual-size bi-directional bus connected to said first and second reduced instruction set microprocessors comprising data, address and control signals, said dual-size bi-directional bus transferring data signals in either a first selected size or a second selected size of data words, said first selected size of data words modulo said second selected size of data words being non-zero;

a plurality of independent very large scale integrated circuit gate arrays connected to said dual-size bi-directional bus and to the plurality of digital data processing subsystems within the file caching computer system, each of said independent very large scale integrated circuit gate arrays selectively performing predetermined functions including transferring data between said independent very large scale integrated circuit gate arrays and transferring data between said independent very large scale integrated circuit gate arrays and the plurality of digital data processing subsystems, wherein a first predetermined number of said independent very large scale integrated circuit gate arrays is controlled by said first reduced instruction set microprocessor and a second predetermined number of said independent very large scale integrated circuit gate arrays is controlled by said second reduced instruction set microprocessor; and maintenance and clock control circuitry coupled to said first and second reduced instruction set microprocessors, said dual-width bi-directional bus, and said independent very large scale integrated circuit gate arrays to control microsequencer bus controller subsystem initialization, subsystem reset/recovery, clock distribution and control, fault detection, maintenance, and synchronization functions.

* * * * *